United States Patent
Mizuno

(10) Patent No.: US 7,913,579 B2
(45) Date of Patent: Mar. 29, 2011

(54) MAGNETOSTRICTIVE LOAD SENSOR AND MOVABLE UNIT COMPRISING SAME

(75) Inventor: Yutaka Mizuno, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 365 days.

(21) Appl. No.: 12/125,351

(22) Filed: May 22, 2008

(65) Prior Publication Data

US 2010/0116066 A1 May 13, 2010

(30) Foreign Application Priority Data

May 16, 2008 (JP) .................................. 2008-129938

(51) Int. Cl.
*G01L 1/12* (2006.01)
(52) U.S. Cl. ..................................................... 73/862.69
(58) Field of Classification Search ............... 73/862.69, 73/779
See application file for complete search history.

(56) References Cited

U.S. PATENT DOCUMENTS

| | | | |
|---|---|---|---|
| 5,739,600 A * | 4/1998 | Kobayashi et al. ............. | 310/26 |
| 6,345,544 B1 | 2/2002 | Mizuno et al. | |
| 7,118,431 B2 | 10/2006 | Mizuno et al. | |
| 7,320,251 B2 | 1/2008 | Harada et al. | |
| 7,337,739 B2 | 3/2008 | Kaneko et al. | |
| 2005/0274195 A1 | 12/2005 | Mizuno et al. | |
| 2007/0032142 A1 | 2/2007 | Mizuno et al. | |

FOREIGN PATENT DOCUMENTS

| | | |
|---|---|---|
| EP | 1593869 A1 | 11/2005 |
| EP | 1909088 A1 | 4/2008 |
| JP | 2001-281074 A | 10/2001 |
| JP | 2003-057127 A | 2/2003 |
| JP | 2003-057128 A | 2/2003 |
| JP | 2003-194640 A | 7/2003 |
| JP | 2003-227766 A | 8/2003 |
| JP | 2004-226196 A | 8/2004 |
| JP | 2004-226203 A2 | 8/2004 |
| JP | 2005-351872 A | 12/2005 |

* cited by examiner

*Primary Examiner* — Lisa M Caputo
*Assistant Examiner* — Octavia Davis
(74) *Attorney, Agent, or Firm* — Keating & Bennett, LLP

(57) ABSTRACT

A magnetostrictive load sensor includes a coil with a through hole, a load sensing member disposed in the through hole, first and second magnetic circuit defining members which are joined together so as to cover the coil and which together define a magnetic circuit to pass a magnetic flux that has been generated by current flowing through the coil, and a housing that houses the coil. The load sensing member and the first and second magnetic circuit defining members are arranged together. Each of the first and second magnetic circuit defining members includes a first portion that contributes to defining the magnetic circuit and a second portion that is arranged so as to extend from the first portion and extend out of the magnetic circuit. The housing holds and fixes together the respective second portions of the first and second magnetic circuit defining members.

14 Claims, 19 Drawing Sheets

- C2: SECOND MAGNETIC CIRCUIT FORMING MEMBER
- E: HOUSING
- C1: FIRST MAGNETIC CIRCUIT FORMING MEMBER
- A: COIL
- B: LOAD SENSING MEMBER
- Da, Db: LOAD TRANSFER MEMBER

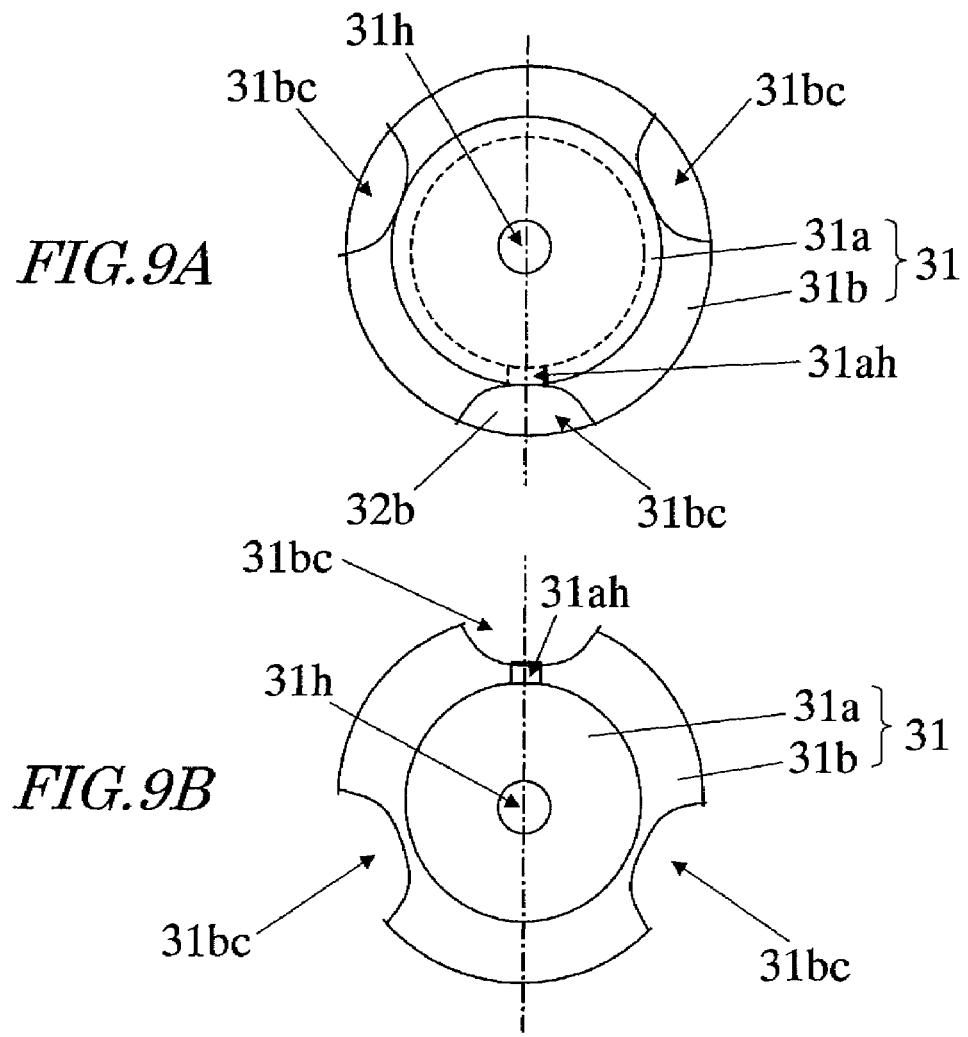

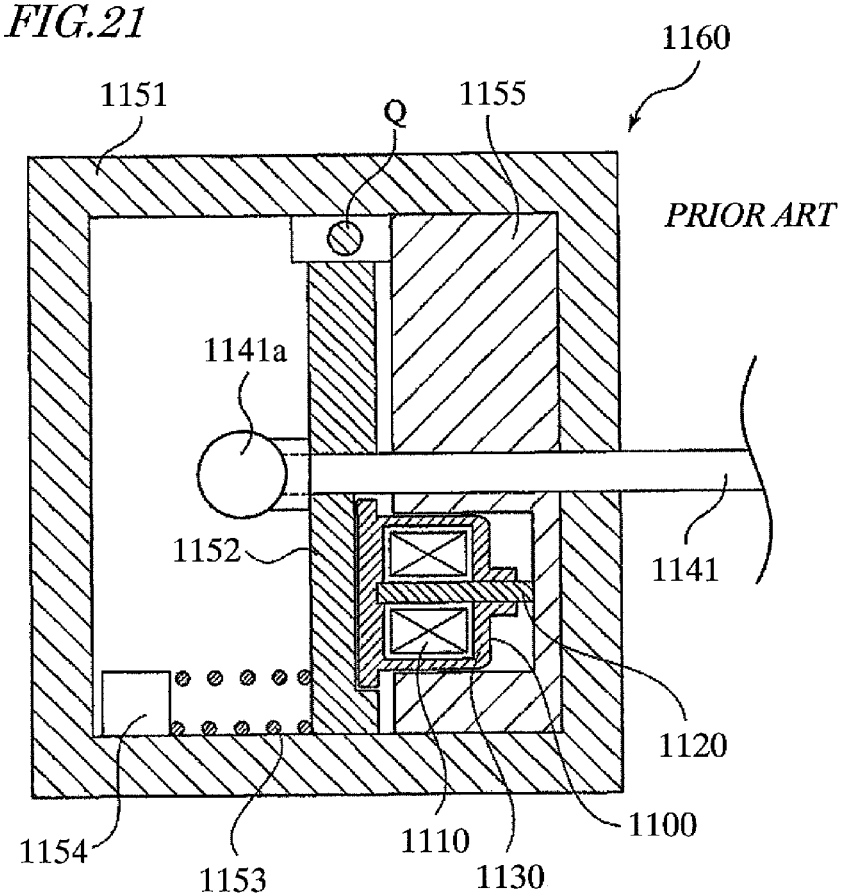
FIG.21 *PRIOR ART*
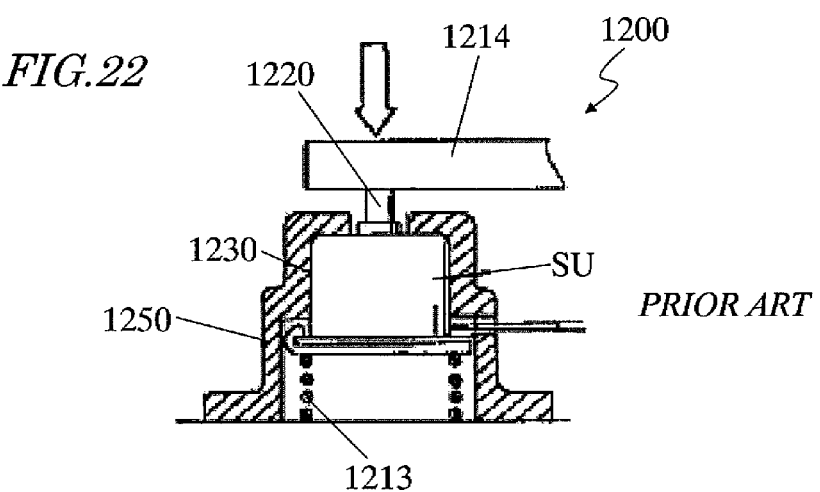
FIG.22 *PRIOR ART*

PRIOR ART

MAGNETOSTRICTIVE LOAD SENSOR AND MOVABLE UNIT COMPRISING SAME

BACKGROUND OF THE INVENTION

1. Field of the Invention

The present invention relates to a magnetostrictive load sensor for electromagnetically sensing a given load by using a magnetostrictive effect, and also to a movable unit (or a motorized device) including such a magnetostrictive sensor.

2. Description of the Related Art

Load sensors for use in various types of vehicles and crafts including, for example, motorcycles, personal watercrafts, and electric cars, should have as small a size as possible. To meet such a demand, a magnetostrictive sensor has been used extensively as a small load sensor. A magnetostrictive load sensor transforms a variation in a magnetic property of a member on which load is placed into a voltage variation thereby allowing the given load to be sensed based on the voltage variation. Magnetostrictive load sensors are disclosed in PCT International Application Publication No. WO 2004/065812, Japanese Patent Application Laid-Open Publication No. 2003-57128, and PCT International Application Publication No. WO 2007/004472, for example.

PCT International Application Publication No. WO 2004/065812 discloses a magnetostrictive load sensor for a power assisted clutch system. FIG. 21 illustrates a magnetostrictive load sensor 1100 as disclosed in PCT International Application Publication No. WO 2004/065812. The magnetostrictive load sensor 1100 includes a load receiving portion 1120, a coil 1110 and a case 1130.

The load receiving portion 1120 is made of a magnetic material, has a rod shape, and is inserted into a through hole of the coil 1110. The case 1130 is also made of a magnetic material and houses the load receiving portion 1120 and the coil 1110 therein.

One end of the load receiving portion 1120 extends out of an opening that is cut through one end of the case 1130 and contacts with a press member 1155. The other end of the load receiving portion 1120 is secured by the other end of the case 1130.

The surface of the other end of the case 1130 is in contact with the holder 1152. One end of a spring 1153 contacts the back surface of the holder 1152. The other end of the spring 1153 is fixed by a fixing portion 1154. This spring 1153 applies a pre-load of a predetermined magnitude to the load receiving portion 1120 by way of the holder 1152.

The magnetostrictive load sensor 1100, the press member 1155, the holder 1152, the spring 1153 and the fixing portion 1154 are housed in a sensor unit housing 1151. The holder 1152 is arranged so as to rotate in the sensor unit housing 1151.

Also, a wire 1141 is arranged so as to run through the sensor unit housing 1151 and the press member 1155 and be inserted into the holder 1152. The end 1141a of the wire 1141 is fixed on the back surface of the holder 1152.

A sensor portion 1160 including the magnetostrictive load sensor 1100 is built in a clutch lever. By handling the clutch lever, the wire 1141 is pulled to turn the holder 1152 around a shaft Q of rotation. As a result, the load receiving portion 1120 of the magnetostrictive load sensor 1100 is pressed by the press member 1155. Consequently, the values of the load placed on the magnetostrictive load sensor 1100 change. A variation in impedance representing such a variation in the load value is detected by a signal detecting section (not shown).

The load receiving portion 1100 is magnetized by the current flowing through the coil 1110. That is why when a press load is applied to the load receiving portion 1120, a reverse magnetostrictive effect is produced to cause a variation in permeability and change the AC resistances (or impedances) of a circuit including the inductance of the coil 1110. And by obtaining a voltage variation between the two terminals of the coil 1110, caused by that impedance change, by the signal detecting section, the given load can be detected electromagnetically.

FIG. 22 illustrates a magnetostrictive load sensor 1200 as disclosed in Japanese Patent Application Laid-Open Publication No. 2003-57128.

The magnetostrictive load sensor 1200 includes a sensor unit SU that is made up of a coil (not shown), a detection rod 1220 and a case 1230. The sensor unit SU is arranged so as to move vertically in a holder 1250 and is biased upward by a spring 1213.

By supplying current to the coil of the sensor unit SU, the detection rod 1220 is magnetized. When an external load is placed on the detection rod 1220 of the sensor unit SU by way of a press plate 1214, compressive stress is applied to the detection rod 1220. Then, a reverse magnetostrictive effect is produced, causing a variation in the permeability of the detection rod 1220 and in other magnetic properties. That is why by converting such a variation in magnetic properties into a voltage variation and outputting it, the external load placed on the detection rod 1220 can be detected.

FIG. 23 illustrates a magnetostrictive load sensor 1300 as disclosed PCT International Application Publication No. WO 2004/065812.

The magnetostrictive load sensor 1300 includes a coil 1310, a magnetic circuit defining member 1330, a rod member 1320, two load transfer members 1340a and 1340b, and a housing 1350.

The coil 1310 consists of a bobbin 1311 and a conductor 1312. A through hole 1310h runs through the core of the bobbin 1311, around which the conductor 1312 is wound.

The magnetic circuit defining member 1330 consists of a cylindrical first casing member 1331 and a substantially disklike second casing member 1332. The first and second casing members 1331 and 1332 are made of a magnetic material and function as a magnetic circuit when the magnetostrictive load sensor 1300 operates.

The coil 1310 is inserted into the first casing member 1331 with an annular elastic member 1319 interposed between them. Meanwhile, the second casing member 1332 may be connected to the end of the first casing member 1331 by, for example, press-fitting the second casing member 1332 into the first casing member 1331.

A circular opening 1331h is cut through the center of one end of the first casing member 1331, while another circular opening 1332h is cut through the center of the second casing member 1332. Spacers SP are attached to these openings 1331h and 1332h.

A columnar rod member 1320 is inserted to run through the through hole 1310h and the two openings 1331h and 1332h. The rod member 1320 is made of a magnetic material, and therefore, is magnetized by the coil 1310 when the magnetostrictive load sensor 1300 operates.

One end 1320a of the rod member 1320 extends out through the opening 1332h, while the other end 1320b thereof extends out through the opening 1331h. The rod member 1320 is supported by the load transfer members 1340a and 1340b.

The load transfer member 1340a consists of a columnar shaft portion 1341a and a flange portion 1342a. A circular recess 1343a is bored at the center of the flange portion 1342a. Likewise, the load transfer member 1340b also consists of a columnar shaft portion 1341b and a flange portion 1342b. A circular recess 1343b is bored at the center of the flange portion 1342b. The one end 1320a of the rod member 1320 is inserted into, and connected to, the recess 1343a of the load transfer member 1340a. The other end 1320b of the rod member 1320 is inserted into, and connected to, the recess 1343b of the load transfer member 1340b.

The housing 1350 includes a cylindrical first housing 1351 and a substantially disk-like second housing 1352. The coil 1310, the magnetic circuit defining member 1330, the rod member 1320 and the load transfer members 1340a and 1340b are all housed in the first housing 1351. The first and second housings 1351 and 1352 are joined together with multiple bolts 1359.

Multiple O-rings O1 through O4, which may be made of an elastic resin, for example, are attached to the first and second housings 1351 and 1352. The shaft portion 1341b of the load transfer member 1340b is elastically supported by the O-ring O1. On the other hand, the shaft portion 1341a of the load transfer member 1340a is elastically supported by the O-ring O4.

When the load applied to the load transfer member 1340a is transferred to the one end 1320a of the rod member 1320, compressive stress is placed on the rod member 1320. Then, a reverse magnetostrictive effect is produced to cause a variation in the permeability of the rod member 1320 and change the impedances of the core portion of the sensor including the coil 1310, the magnetic circuit defining member 1330 and the rod member 1320. As a result, induced electromotive force (i.e., voltage) generated in the coil 1310 changes. By measuring this voltage variation sensed by a peripheral circuit, the load applied to the load transfer member 1340a can be detected. Likewise, even when a load is applied to the load transfer member 1340b, that load can be detected in the same way.

These magnetostrictive load sensors 1100, 1200 and 1300 disclosed in PCT International Application Publication No. WO 2004/065812, Japanese Patent Application Laid-Open Publication No. 2003-57128, and PCT International Application Publication No. WO 2007/004472, respectively, have mutually different sensor holding structures. Specifically, the magnetostrictive load sensor 1100 of PCT International Application Publication No. WO 2004/065812 holds the sensor by applying a pre-load to the load receiving portion 1120 with one end of the case 1130 pressed. On the other hand, the magnetostrictive load sensor 1200 of Japanese Patent Application Laid-Open Publication No. 2003-57128 holds the sensor unit SU by pressing the case 1230 of the sensor unit SU against the holder 1250. And in the magnetostrictive load sensor 1300 of PCT International Application Publication No. WO 2007/004472, a portion of the second casing member 1332 is extended outside of the magnetic circuit and is sandwiched between the first and second housings 1351 and 1352, thereby holding the core portion of the sensor including the coil 1310, the rod member 1320 and magnetic circuit defining member 1330.

In the holding structure of the magnetostrictive load sensor 1100 disclosed in PCT International Application Publication No. WO 2004/065812, however, a pre-load is applied to the load receiving portion 1120. That is why if the magnetostrictive load sensor 1100 is exposed to significant vibrations or impact, the magnitude of the pre-load would vary to make the zero-point output not constant.

The holding structure of the magnetostrictive load sensor 1200 disclosed in Japanese Patent Application Laid-Open Publication No. 2003-57128 will be affected less by vibrations or impact than the counterpart of the magnetostrictive load sensor 1100 of PCT International Application Publication No. WO 2004/065812. However, as a load is applied to the case 1230 that forms a magnetic circuit, the zero-point output could fluctuate too.

In the holding structure of the magnetostrictive load sensor 1300 disclosed in PCT International Application Publication No. WO 2007/004472, the core portion of the sensor is held outside of the magnetic circuit, and therefore, is not affected by vibrations or impact so easily. However, in a situation where the first and second casing members 1331 and 1332 are press-fit into each other, if the press fit load is great, then the magnetic properties will deteriorate due to stress. That is why the press fit load cannot be sufficiently increased. Therefore, if the press fit portions shift from each other due to excessive vibrations or impact, the resistance of the magnetic circuit might vary which would affect the output.

FIGS. 24 and 25 schematically illustrate what will happen in the magnetostrictive load sensor 1300 of PCT International Application Publication No. WO 2007/004472 if the press fit portions shift from each other.

As shown in FIG. 24, if the first casing member 1331 shifted to the right, the area of contact between the first and second casing members 1331 and 1332 would decrease (as indicated by the dashed circles P1 in FIG. 24). As a result, the magnetic resistance would increase causing the zero-point output to vary from its intended value. Besides, the position of the first casing member 1331 would easily change after that due to vibrations or impact, thus causing a further fluctuation in the zero-point output. On top of that, the pressure applied by the first casing member 1331 on the elastic member 1319 would decrease (as indicated by the dashed circles P2 in FIG. 24). In that case, the coil 1310 would move easily due to vibrations or impact, thus making the properties inconsistent or causing a disconnection or short in the lead wire (i.e., the conductor 1312 extending from the coil 1310).

Likewise, as shown in FIG. 25, if the second casing member 1332 shifted obliquely, the area of contact between the first and second casing members 1331 and 1332 would also decrease (as indicated by the dashed circle P1 in FIG. 25). As a result, the magnetic resistance would increase causing the zero-point output to vary from its intended value. Besides, the position of the first casing member 1331 would easily change after that due to vibrations or impact, thus causing a further fluctuation in the zero-point output. On top of that, the pressure applied by the first casing member 1331 on the elastic member 1319 would decrease (as indicated by the dashed circle P2 in FIG. 25). In that case, the coil 1310 would move easily due to vibrations or impact, thus making the magnetic properties inconsistent or causing a disconnection or short in the lead wire (i.e., the conductor 1312 extending from the coil 1310). Furthermore, as the first casing member 1331 and the rod member 1320 would make a tight contact with each other either directly or with the spacers SP interposed (as indicated by the dashed circle P3 in FIG. 25), some load loss would be caused. In that case, not only would the electromagnetic properties vary significantly but it also may no longer be possible to accurately sense loading.

SUMMARY OF THE INVENTION

In order to overcome the problems described above, preferred embodiments of the present invention provide a magnetostrictive load sensor that guarantees high reliability without being affected by excessive vibrations or impact, and a motorized device including such a magnetostrictive load sensor.

A magnetostrictive load sensor according to a preferred embodiment of the present invention includes a coil with a through hole, a load sensing member that is disposed in the through hole, first and second magnetic circuit defining members, which are joined together so as to cover the coil and which together define a magnetic circuit that conducts a magnetic flux that has been generated by a current flowing through the coil, and a housing that houses all of the coil, the load sensing member, and the first and second magnetic circuit defining members together. Each of the first and second magnetic circuit defining members includes a first portion that contributes to forming the magnetic circuit and a second portion that is arranged so as to extend from the first portion and extend out of the magnetic circuit. The housing holds and fixes together respective second portions of the first and second magnetic circuit defining members.

In one preferred embodiment, the coil includes a bobbin, a conductor wound around the bobbin, and the first portion of one of the first and second magnetic circuit defining members has a conductor passage hole to pass the conductor that extends from the coil.

In this particular preferred embodiment, the second portion of the one magnetic circuit defining member is arranged so as to overlap with the conductor passage hole when viewed substantially along the central axis of the through hole.

In another preferred embodiment, when viewed along the central axis of the through hole, the outer periphery of the second portion of the one magnetic circuit defining member is partially in contact with the outer periphery of the first portion of the same magnetic circuit defining member.

In a specific preferred embodiment, the outer periphery of the second portion has a linear portion that runs along a substantially tangential line drawn with respect to the conductor passage hole.

In a more specific preferred embodiment, the linear portion on the outer periphery of the second portion has a greater width than the conductor passage hole.

In another preferred embodiment, the second portion of the one magnetic circuit defining member has a notch cut in the vicinity of the conductor passage hole and has a greater width than the conductor passage hole.

In still another preferred embodiment, the conductor passage hole is bored as a slit so as to run continuously from one end of the first portion.

In yet another preferred embodiment, when viewed along the central axis of the through hole, the second portion is substantially symmetrical axially with respect to a line that passes through the respective centers of the through hole and the conductor passage hole.

In yet another preferred embodiment, as viewed along the central axis of the through hole, the second portion is substantially symmetrical rotationally.

In yet another preferred embodiment, the magnetostrictive load sensor further includes an elastic member that is arranged between the second portion of one of the first and second magnetic circuit defining members and the housing.

In yet another preferred embodiment, the first and second magnetic circuit defining members are joined together by press-fitting, bonding, threaded fasteners, etc.

In this particular preferred embodiment, a direction in which the second portion is fixed by the housing is substantially the same as a direction in which the first and second magnetic circuit defining members are joined together by press-fitting, bonding, threaded fasteners, etc.

A motorized device according to a preferred embodiment of the present invention includes a magnetostrictive load sensor having the structure described above.

The preferred embodiments of the present invention provide a magnetostrictive load sensor that guarantees high reliability almost without being affected by excessive vibrations or impact and also provides a motorized device including such a magnetostrictive load sensor.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 9A is a top view schematically illustrating first and second yokes, and FIG. 9B is a bottom view schematically illustrating only the first yoke.

FIG. 21 is a cross-sectional view schematically illustrating a conventional magnetostrictive load sensor.

FIG. 22 is a cross-sectional view schematically illustrating a conventional magnetostrictive load sensor.

DETAILED DESCRIPTION OF PREFERRED EMBODIMENTS

Figure 1:
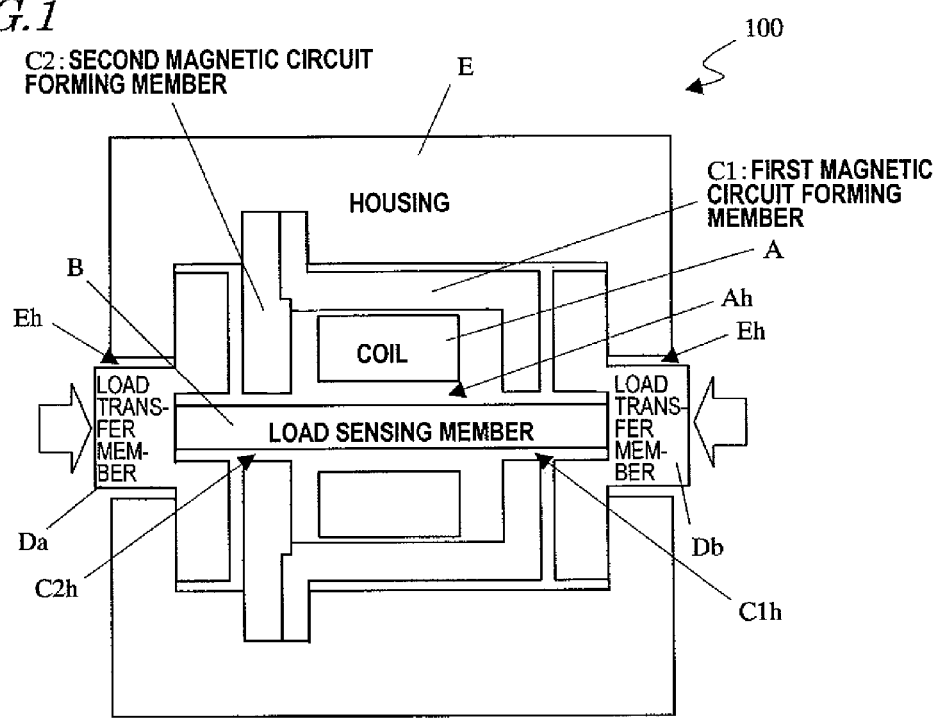
FIG. 1 is a schematic representation of a magnetostrictive load sensor 100 according to a preferred embodiment of the present invention.

Hereinafter, preferred embodiments of the present invention will be described with reference to the accompanying drawings. However, it should be noted that the present invention is in no way limited to the following specific preferred embodiments.

First Preferred Embodiment

First, the basic structure of a magnetostrictive load sensor 100 according to a first preferred embodiment of the present invention will be described with reference to FIGS. 1 and 2.

The magnetostrictive load sensor 100 includes a coil A, a load sensing member B, first and second magnetic circuit defining members C1, C2, two load transfer members Da, Db, and a housing E.

The load sensing member B and the first and second magnetic circuit defining members C1 and C2 are made of a magnetic material, whereas the load transfer members Da and Db and the housing E are made of a non-magnetic material.

As used herein, "magnetic material" is a material that becomes magnetized when put under a magnetic field. Examples of preferred magnetic materials include iron-based materials, iron-chromium-based materials, iron-nickel based materials, iron-cobalt-based materials, iron-silicon-based materials, iron-aluminum-based materials, pure iron, permalloys, giant magnetostrictive materials, and ferrite-based stainless steel (such as SUS 430), etc. A material's permeability is a measurement of how easily a magnetic material becomes magnetized. For example, iron has a relative permeability (i.e., the ratio of its permeability to that of a vacuum) of 200.

On the other hand, "non-magnetic material" refers to any material other than magnetic materials, and typically is a material with a relative permeability of approximately one. Examples of preferred non-magnetic materials include austenite-based stainless steel (such as SUS 304), aluminum, and copper, which have relative permeabilities of 1 to 1.01.

The coil A has a through hole Ah and includes at least one conductor (not shown), which is wound a number of times.

The load sensing member B has a rod shape and is inserted into the through hole Ah of the coil A. The load sensing member B will be simply referred to herein as a "rod member".

The first and second magnetic circuit defining members C1 and C2 are joined together so as to cover the coil A, and together define a magnetic circuit to transmit a magnetic flux generated by the current flowing through the coil A. In the following description, the first and second magnetic circuit defining members C1 and C2 will be simply referred to herein as a "first yoke" and a "second yoke", respectively. The outer periphery and both ends of the coil A are covered with the first and second yokes C1 and C2 that are joined together. Openings C1h and C2h are cut out at the respective centers of the first and second yokes C1 and C2 to allow both ends of the rod member B to extend out through these openings C1h and C2h.

One end of the rod member B is fit into one (Da) of the two load transfer members Da and Db, while the other end of the rod member B is fit into the other load transfer member Db.

The housing E houses the coil A, the rod member B, the first and second yokes C1, C2, and the load transfer members Da, Db altogether. Openings Eh are cut out at the centers of both ends of the housing E. Portions of the load transfer members Da and Db protrude through these openings Da and Db.

Although not shown in FIG. 1, the conductor (or lead wire) extending from the coil A is extended through a conductor passage hole, which is bored through one of the first and second yokes C1 and C2, to the outside of the first and second yokes C1 and C2 to be connected to peripheral circuits (load sensing circuits, etc.) including an oscillator, a voltage detector (or current detector), a rectifier, an amplifier, or the like.

Hereinafter, it will be described how this magnetostrictive load sensor 100 operates. An oscillator included in the peripheral circuits (not shown) supplies alternating current to the coil A by way of the lead wire, thereby driving the coil A. In this case, the coil A serves as a magnetizing coil to magnetize the rod member B. Meanwhile, the first and second yokes C1 and C2 function as a magnetic circuit.

Figure 2:
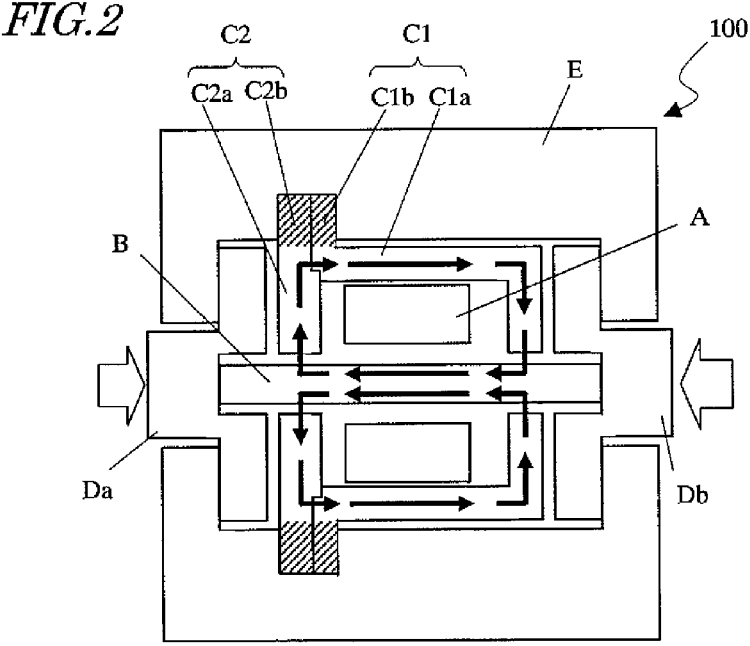
FIG. 2 is a schematic representation of the magnetostrictive load sensor 100 of a preferred embodiment of the present invention.

FIG. 2 schematically illustrates the magnetic circuits to be formed in the magnetostrictive load sensor 100. In FIG. 2, the directions of flux of the magnetic field that is generated when the coil A is driven are indicated by the arrows. As can be seen from FIG. 2, when the coil A is driven, lines of magnetic induction are produced so as to define closed circuits (i.e., magnetic circuits).

The load applied to the load transfer member Da is transferred to one end of the rod member B. In this manner, compressive stress is exerted on the rod member B. Then, a reverse magnetostrictive effect is produced to cause a variation in the permeability of the rod member B to thereby change the impedances of the assembly including the coil A, the rod member B, and the first and second yokes C1 and C2 (which will be referred to herein as a "sensor core portion"). As a result, the amount of induced electromotive force (i.e., voltage) generated in the coil A changes. In this manner, the coil A functions as a sensor coil. The voltage at the coil A is detected by the peripheral circuits via the lead wire. The load applied to the load transfer member Da can be sensed based on the variation in the voltage detected at the coil A.

Even when the load is applied to the other load transfer member Db, that load applied to member Db can also be sensed in the same way. In this manner, the magnetostrictive load sensor 100 can sense the loads applied to one and the other ends of the rod member B. Thus, the loads that have been applied in two different directions can be sensed with the single magnetostrictive load sensor 100.

The load transfer member Da not only transfers the applied load to the rod member B but also receives the load transferred to the rod member B by way of the other load transfer member Db. Likewise, the load transfer member Db not only transfers the applied load to the rod member B but also receives the load transferred to the rod member B by way of the other load transfer member Da. That is to say, these two load transfer members Da and Db perform the functions of transferring and receiving loads.

In the magnetostrictive load sensor 100 of this preferred embodiment, the first yoke C1 includes a first portion C1a that contributes to defining a magnetic circuit and a second portion C1b extending from the first portion C1a and reaching outside of the magnetic circuit as shown in FIG. 2. The second yoke C2 also includes a first portion C2a that contributes to forming a magnetic circuit and a second portion C2b extending from the first portion C1a and reaching outside of the magnetic circuit. In the following description, the respective first portions C1a and C2a contributing to forming the magnetic circuit will be referred to herein as "body portions" and the respective second portions C1b and C2b extending outward from the body portions C1a and C2a will be referred to herein as "flange portions". In FIG. 2, the flange portions C1b and C2b are shaded.

Furthermore, in the magnetostrictive load sensor 100, the housing E holds and fixes together the respective flange portions C1b and C2b of the first and second yokes C1 and C2. That is to say, the first and second yokes C1 and C2 are held and fixed outside of the magnetic circuit.

Figure 24:
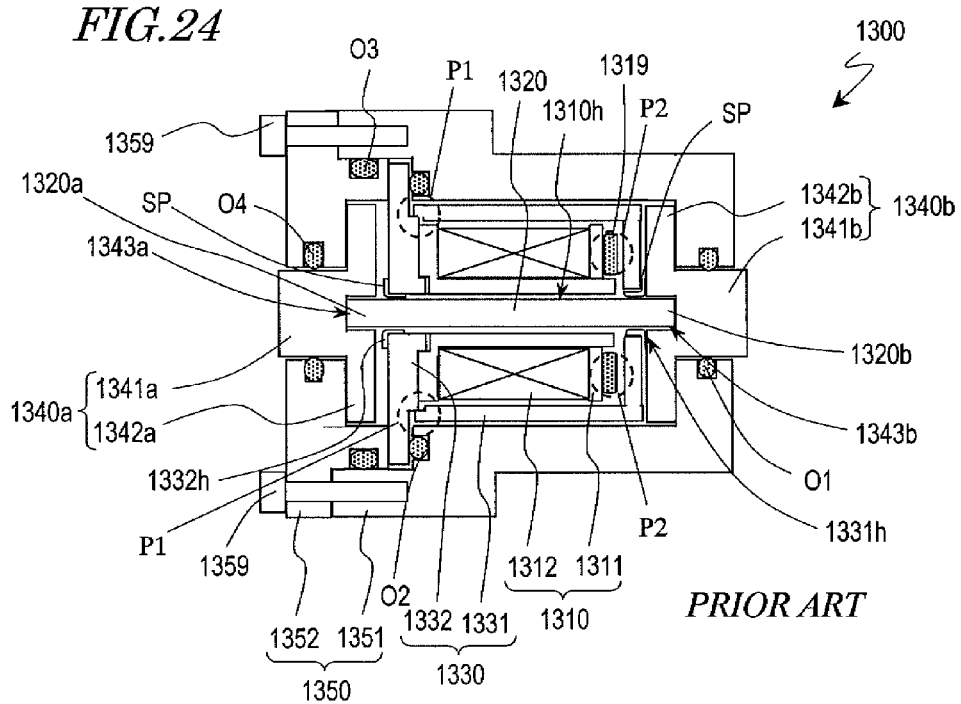
FIG. 24 is a cross-sectional view further illustrating the conventional magnetostrictive of FIG. 23.
Figure 25:
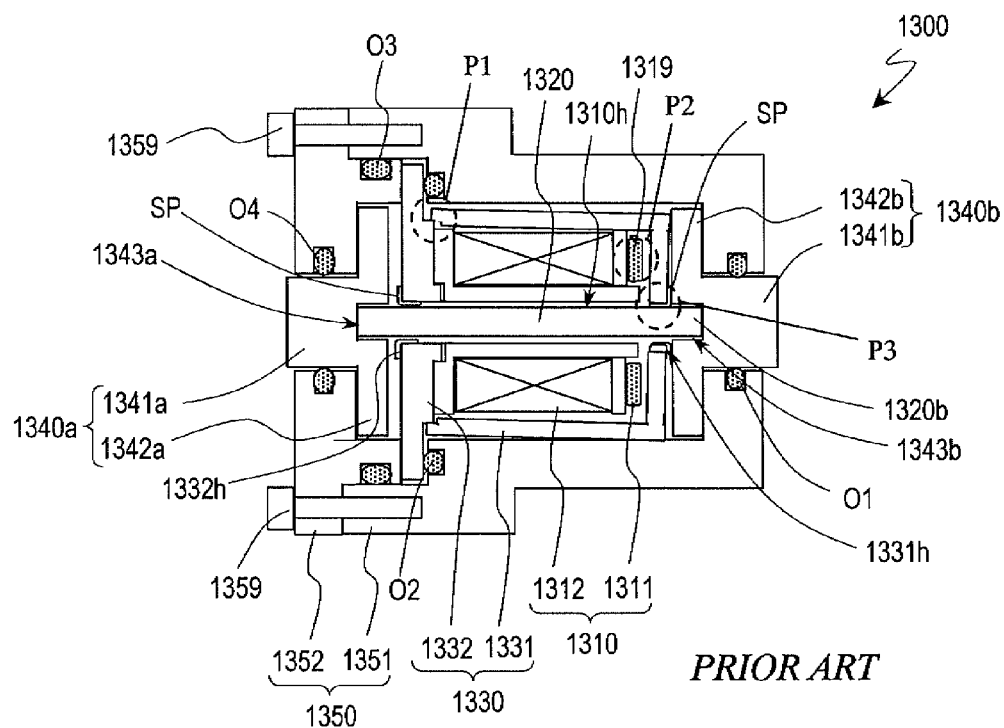
FIG. 25 is another cross-sectional view further illustrating the conventional magnetostrictive load sensor of FIG. 23.

As described above, in the magnetostrictive load sensor 100 of this preferred embodiment, the housing E holds and fixes together the respective flange portions C1b and C2b of the first and second yokes C1 and C2, thereby holding the sensor core portion outside of the magnetic circuit. Because of this, the magnetostrictive load sensor 100 is hardly affected by vibrations or impact. Also, in the magnetostrictive load sensor 100 of this preferred embodiment, not one but both of the first and second yokes C1 and C2 include the flange portions C1b and C2b, which are held and fixed together by the housing E. For that reason, even if this magnetostrictive load sensor 100 is exposed to excessive vibrations or impact, the first and second yokes C1 and C2 will not become easily disengaged from one another. Consequently, the variation in magnetic resistance and the fluctuation in zero-point output can be reduced significantly, thus overcoming the various problems that have already been described with reference to FIGS. 24 and 25. In this manner, the magnetostrictive load sensor 100 of this preferred embodiment is hardly affected by excessive vibrations or impact, and a high reliability can be guaranteed.

Next, examples of more specific structures for the magnetostrictive load sensor 100 will be described.

Figure 3:
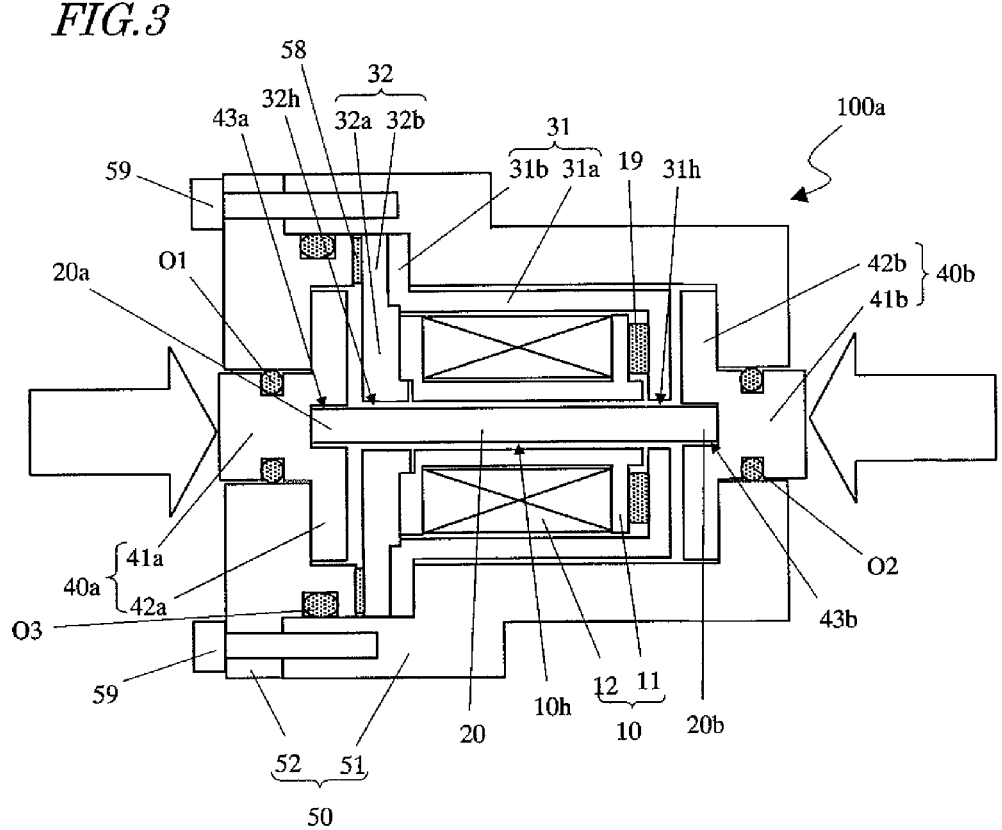
FIG. 3 is a cross-sectional view schematically illustrating a magnetostrictive load sensor 100a according to a preferred embodiment of the present invention.
Figure 4:
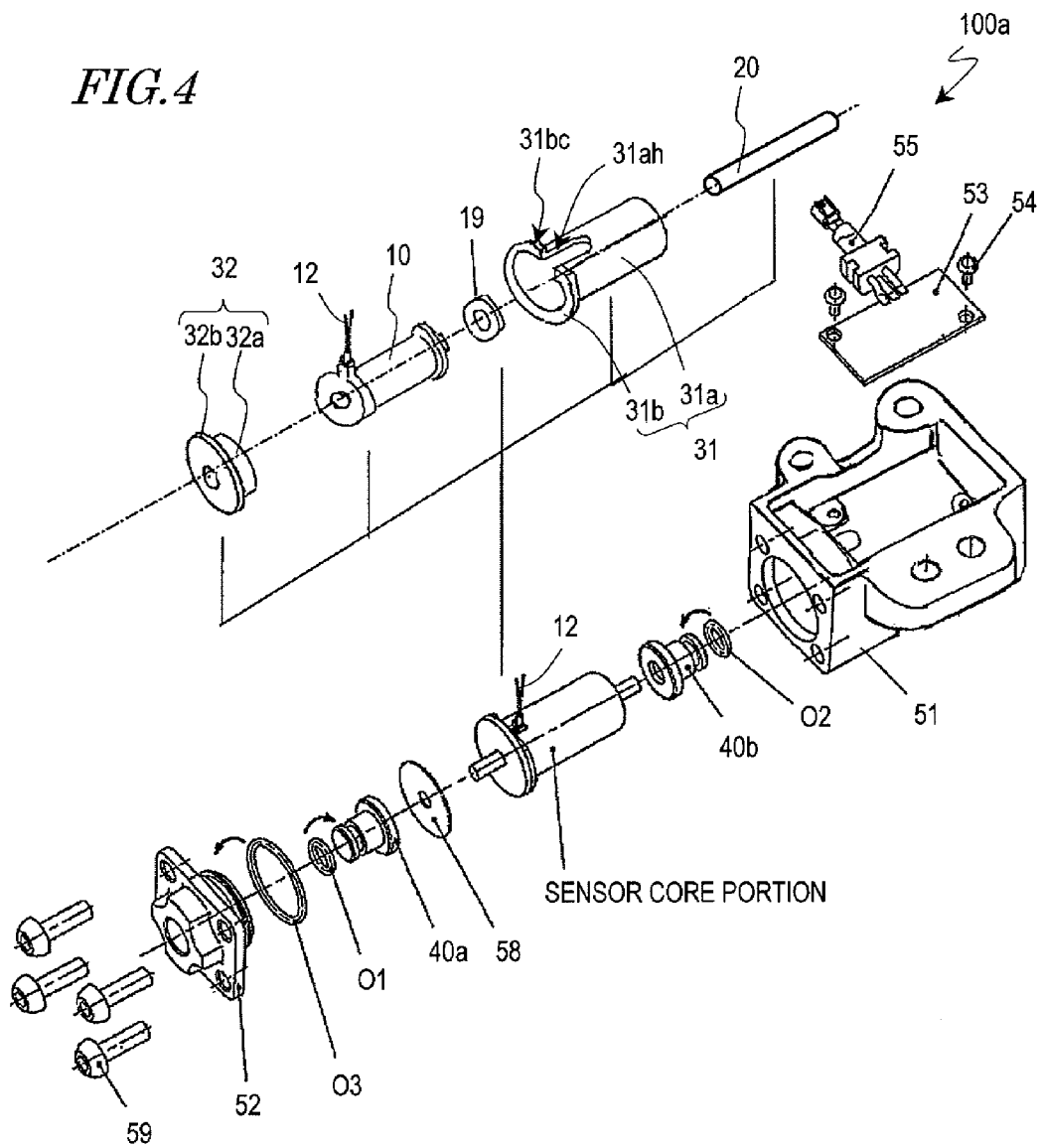
FIG. 4 is an exploded perspective view of the magnetostrictive load sensor 100a of a preferred embodiment of the present invention.

FIGS. 3 and 4 illustrate an exemplary specific structure for the magnetostrictive load sensor 100. The magnetostrictive load sensor 100a shown in FIGS. 3 and 4 includes a coil 10, a rod member 20, first and second yokes 31, 32, two load transfer members 40a, 40b, and a housing 50, which respectively correspond to the coil A, the rod member B, the first and second yokes C1, C2, the load transfer members Da, Db and the housing E shown in FIG. 1.

The coil 10 includes a bobbin 11 and a conductor 12 that is wound around the bobbin 11. A through hole 10h is bored through the core of the bobbin 11. A portion of the conductor 12 extends as a lead wire from the coil 10.

The rod member 20 has a columnar shape and is inserted into the through hole 10h of the coil 10. The rod member 20 is made of a magnetic material and becomes magnetized by the coil 10 when the magnetostrictive load sensor 100a operates.

The first yoke 31 includes a body portion 31a, which contributes to forming a magnetic circuit, and a flange portion 31b which extends outward from the body portion 31a. The body portion 31a has a cylindrical (or tube-like) shape with an outer surface and a bottom surface, while the flange portion 31b has a substantially annular shape. The first yoke 31 as a whole has a top hat shape. A circular opening 31h is cut out at the center of the bottom surface of the body portion 31a. The body portion 31a also has a conductor passage hole 31ah to pass the conductor (lead wire) 12 extending from the coil 10 as shown in FIG. 4. The conductor passage hole 31ah is located in the vicinity of the flange portion 31b. In other words, the conductor passage hole 31ah and the flange portion 31b are arranged so as to overlap with each other substantially in the axial direction (i.e., along the central axis of the through hole 10h). Furthermore, as shown in FIG. 4, the flange portion 31b has a notch 31bc in the vicinity of the conductor passage hole 31ah. This notch 31bc will be described in detail later.

The second yoke 32 also includes a body portion 32a, which contributes to defining a magnetic circuit, and a flange portion 32b, which extends outward from the body portion 32a. The body portion 32a is substantially disk-like, while the flange portion 32b is disk-like. The second yoke 32 as a whole has an almost disk-like shape. A circular opening 32h is cut out through the center of the body portion 32a.

The first and second yokes 31 and 32 are both made of a magnetic material, and together they function as a magnetic circuit while the magnetostrictive load sensor 100a operates.

The coil 10 is inserted into the first yoke 31 with an annular elastic member 19 interposed between them. The first and second yokes 31 and 32 are joined together, and the coil 10 is housed in the space defined by the first and second yokes 31 and 32. One end 20a and another other end 20b of the rod member 20 extend out through the openings 31h and 32h, respectively. The first and second yokes 31 and 32 may be joined together by, for example, press-fitting them with each other.

The load transfer member 40a includes a columnar shaft portion 41a and a flange portion 42a. The flange portion 42a is located at one end of the columnar shaft portion 41a and a circular recess 43a is bored at the center of the flange portion 42a. Likewise, the other load transfer member 40b also includes a columnar shaft portion 41b and a flange portion 42b. The flange portion 42b is located at one end of the columnar shaft portion 41b and a circular recess 43b is bored at the center of the flange portion 42b. These load transfer members 40a and 40b are made of a non-magnetic material. One end 20a of the rod member 20 is fit into the recess 43a of the load transfer member 40a, while the other end 20b of the rod member 20 is fit into the recess 43b of the load transfer member 40b. Thus, the rod member 20 is supported by these load transfer members 40a and 40b.

The housing 50 includes a housing body (corresponding to the first housing member) 51 that houses the sensor core portion and a housing cap (corresponding to the second housing member) 52, which is attached to the open end surface of the housing body 51. The housing body 51 and the housing cap 52 are made of a non-magnetic material. The housing cap 52 is secured onto the housing body 51 with a number of bolts 59, for example. And the respective flange portions 31b and 32b of the first and second yokes 31 and 32 are sandwiched between the housing body 51 and the housing cap 52. A substrate 53 (shown in FIG. 4) including the peripheral circuits (i.e., load sensing circuits) is further provided for the housing body 51. The substrate 53 is attached onto the housing body 51 with fittings 54. The lead wire 12 extending from the coil 10 is connected to the substrate 53. Also, the substrate 53 is further connected to an external device (not shown) by way of a cable 55.

The rod member 20 and the first and second yokes 31 and 32 are preferably made of a corrosion resistant magnetic material. In this preferred embodiment, SUS 430 is used as a (magnetic) material for the rod member 20 and the first and second yokes 31 and 32. Also, in this preferred embodiment, SUS 304 is used as a (non-magnetic) material for the load transfer members 40a and 40b, and an aluminum alloy is used as a (non-magnetic) material for the housing body 51 and the housing cap 52.

O-rings O1 and O2, made of an elastic resin, for example, are attached to the load transfer members 40a and 40b, respectively. Specifically, the O-ring O1 is provided in a groove formed at the outer surface of the shaft portion 41a of the load transfer member 40a, while the O-ring O2 is provided in a groove formed at the outer surface of the shaft portion 41b of the load transfer member 40b. The cross-sectional diameter of these O-rings O1 and O2 preferably is greater than the depth of their associated threads. Thus, in the housing 50, the shaft portions 41a and 41b of the load transfer members 40a and 40b are supported elastically by the O-rings O1 and O2. Another O-ring O3 is attached to the housing cap 52. The O-ring O3 is provided in a groove formed at the outer surface of the housing cap 52 (i.e., the outer surface of its portion to engage with the housing body 51).

Furthermore, an annular elastic member (serving as a packing) 58 is arranged between the flange portion 32b of the second yoke 32 and the housing cap 52. Thus, the first and second yokes 31 and 32 are supported elastically by the elastic member 58 inside the housing 50. The first and second yokes 31 and 32 and the housing 50 could have some dimensional errors when they are made, but by providing the elastic member 58, the influence of the dimensional error (i.e., the error in the thickness direction of the flange portions 31b and 32b) can be reduced when the housing cap 52 is fastened on the housing body 51 with the bolts 59. Without the elastic member 58, according to the magnitude of the dimensional error, a gap could be left between the end surface of the flange portion 32b of the second yoke 32 and that of the housing cap 52, thus sometimes making it difficult to hold the first and second yokes 31 and 32 firmly (i.e., loosening them unintentionally). Alternatively, a gap could also be left between the respective end surfaces of the housing body 51 and the housing cap 52, thus possibly placing too much stress on the flange portions 31b and 32b or causing some problem with the fixture or waterproof property of the housing 50. By using the elastic member 58, those gaps can be eliminated and it is also possible to prevent (1) the first and second yokes 31 and 32 from being loosened, and/or (2) the flange portions 31b and 32b from being fastened excessively.

Furthermore, even if the magnetostrictive load sensor 100a is exposed to vibrations or impact, the vibrations or impact produced in the first and second yokes 31 and 32 can be dissipated by the elastic member 58. As a result, the output of the magnetostrictive load sensor 100a will hardly ever vary, even under the influence of such vibrations or impact produced in the rod member 20. In this example, the elastic member 58 is arranged between the flange portion 32b of the second yoke 32 and the housing cap 52. However, the same effect can be achieved by providing the elastic member between the flange portion 31b of the first yoke 31 and the housing body 51. That is to say, by providing the elastic member between one of the first and second yokes 31 and 32 and the housing 50, there will never be too much stress placed on the first and second yokes 31 and 32 and the performance of the sensor can be stabilized while the variations are minimized. The influence of the dimensional error can also be reduced significantly.

Figure 5A:
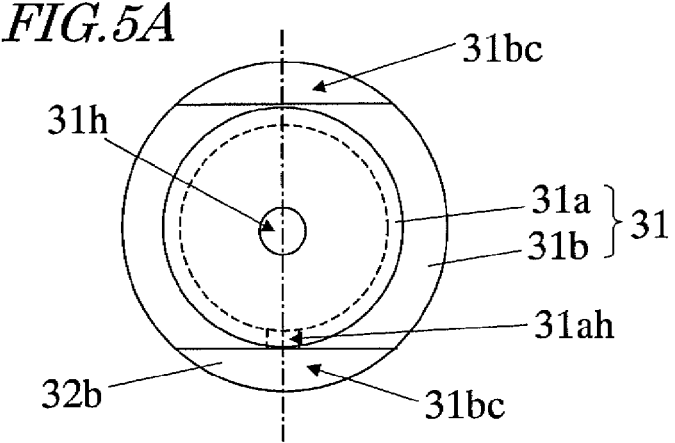
FIGS. 5A through 5C are respectively a top view, a side view schematically illustrating first and second yokes, and a bottom view schematically illustrating only the first yoke.
Figure 5B:
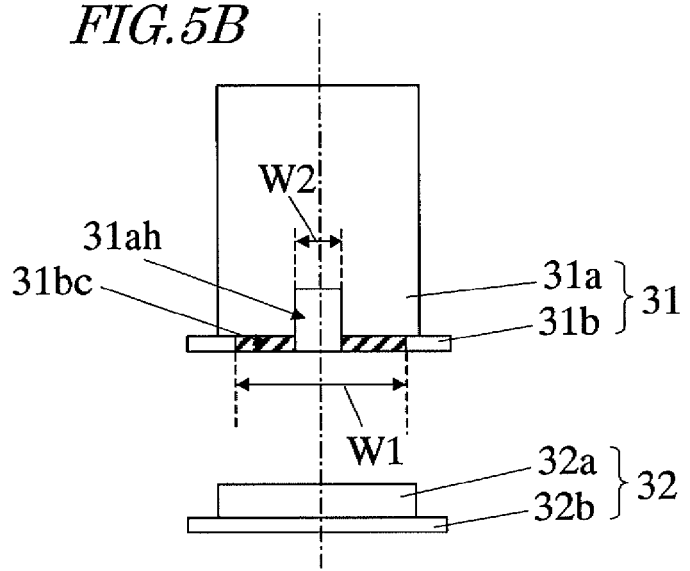

Hereinafter, the conductor passage hole 31ah and notch 31bc of the first yoke 31 will be described in further detail with reference to FIGS. 5A-5C. FIGS. 5A and 5B are respectively a top view and a side view illustrating first and second yokes 31 and 32 and FIG. 5C is a bottom view schematically illustrating only the first yoke 31.

As shown in FIGS. 5A and 5B, the body portion 31a of the first yoke 31 has a conductor passage hole 31ah arranged to pass the conductor (or lead wire) 12 extending from the coil 10 in the vicinity of the flange portion 31b (i.e., at one end thereof closer to the flange portion 31b). Also, the flange portion 31b of the first yoke 31 has a notch 31bc in the vicinity of the conductor passage hole 31ah. That is to say, the flange portion 31b of the first yoke 31 is not completely annular but has a partially notched ring shape. In this example, notches 31bc are cut not just in the vicinity of the conductor passage hole 31ah but also on the opposite side as well. That is to say, as viewed along the central axis of the opening 31h of the first yoke 31, a pair of notches 31bc are arranged substantially symmetrically with respect to the opening 31h. Also, the flange portion 31b of the first yoke 31 is notched along a substantially tangential line drawn with respect to the conductor passage hole 31ah (i.e., in contact with the conductor passage hole 31ah and substantially perpendicularly to a line that passes the respective centers of the opening 31h and the conductor passage hole 31ah) as shown in FIGS. 5A and 5C.

Figure 5C:
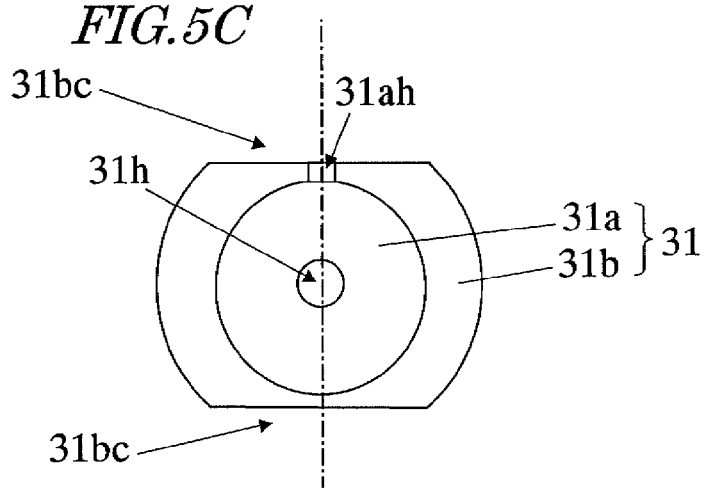
Figure 6A:
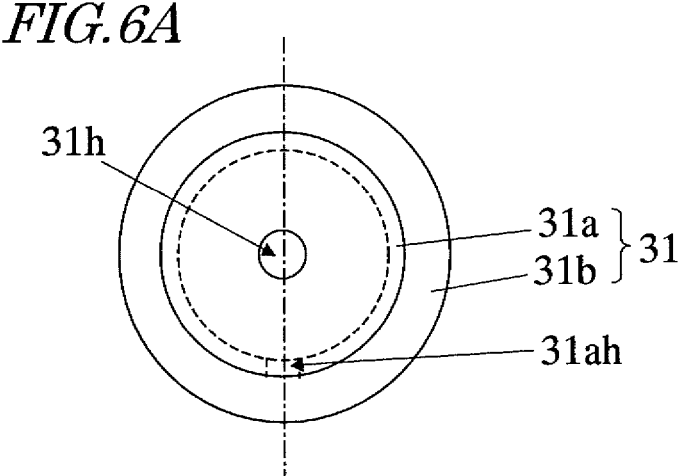
FIGS. 6A through 6C are respectively a top view, a side view, and a bottom view schematically illustrating another first yoke.
Figure 6B:
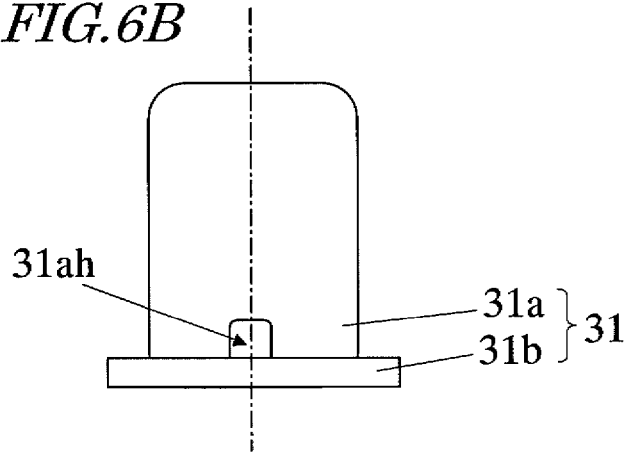
Figure 6C:
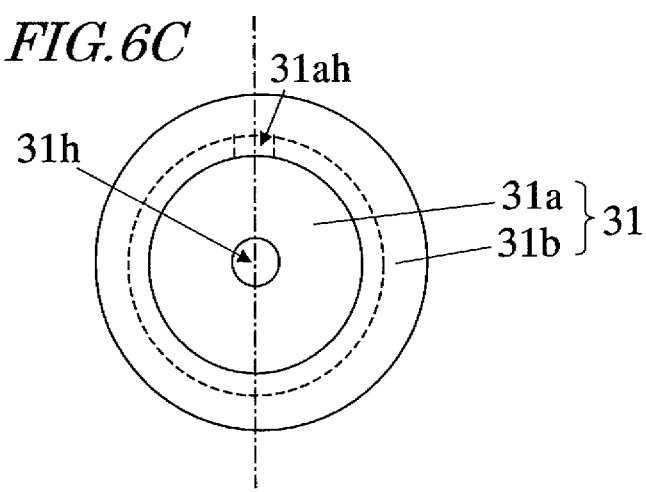

In the example illustrated in FIGS. 5A-5C, the flange portion 31b of the first yoke 31 has the notches 31bc. Alternatively, the flange portion 31b may have no notches 31bc at all as in the first yoke 31 shown in FIGS. 6A-6C. However, if the conductor passage hole 31ah is bored without cutting the notches 31bc as shown in FIG. 6A-6C, it would be difficult to bore the conductor passage hole 31ah using a simple technique (which would require cutting or drilling instead), thus increasing the manufacturing cost.

On the other hand, in the example illustrated in FIGS. 5A-5C, the notch 31bh is cut in the vicinity of the conductor passage hole 31ah of the flange portion 31b. Thus, the outer periphery of the flange portion 31b (as viewed along the central axis of the through hole 10h of the coil 10) is partially in contact with that of the body portion 31a. If the flange portion 31b has such an outer periphery, the conductor passage hole 31ah can be easily bored by a press process after the first yoke 31 with the notches 31bh being formed by a forging process. As a result, the manufacturing process becomes more efficient at a reduced cost. Additionally, the step of extending the lead wire 12 can also be performed easily.

Besides, when the first yoke 31 is formed by a forging process, the conductor passage hole 31ah and the notches 31bc can be bored at the same time. That is to say, the first yoke 31 with the conductor passage hole 31ah and the notches 31bc can be formed integrally by a forging process, for example. As a result, the cost can be further reduced.

When the flange portion 31b needs to be notched, the notch is preferably cut along a substantially tangential line that is drawn with respect to the conductor passage hole 31ah as shown in FIGS. 5A-5C. In other words, the outer periphery of the flange portion 31b preferably includes a linear portion that runs straight along the substantially tangential line drawn with respect to the conductor passage hole 31ah. The flange portion 31b with such a notched shape can be formed easily with a forging die of a simple shape, thus reducing the cost of making such a forging die. Also, the press process can become more efficient because the flange portion 31b never interferes with the press process.

In this preferred embodiment, the conductor passage hole 31ah and the flange portion 31b are arranged so as to overlap with each other in the axial direction (i.e., as viewed along the central axis of the through hole 10h). Thus, the conductor passage hole 31ah is located in the vicinity of the junction between the first and second yokes 31 and 32, and therefore, the lead wire 12 can be extended more efficiently.

In the example illustrated in FIGS. 6A-6C, the conductor passage hole 31ah has a closed end entirely surrounded with portions including a magnetic material (see FIG. 6B, in particular). That is to say, the hole is more of an opening. On the other hand, in the example illustrated in FIGS. 5A-5C, the conductor passage hole 31ah does not have such a closed end, rather, it has a slit shape running continuously from one end of the body portion 31a (i.e., the end closer to the second yoke 32) (see FIG. 5B, in particular). If the conductor passage hole 31ah has such a slit shape (i.e., has such an opened end), the lead wire 12 can be extended even more efficiently. It should be noted that the slit-like conductor passage hole 31ah does not have to be a rectangular slit as illustrated in FIG. 5B.

As shown in FIGS. 5A and 5C, as viewed along the central axis of the through hole 10h of the coil 10 (which is substantially aligned with the central axis of the opening 31h of the first yoke 31), the flange portion 31b is preferably symmetrical with respect to a line that passes both the center of the through hole 10h (which substantially aligns with the center of the opening 31h) and that of the conductor passage hole 31ah (i.e., the one-dot chain shown in FIGS. 5A and 5C). If the flange portion 31b has such a shape, the stress placed on the forging die during the forging (press forming) process can have a uniform distribution, and therefore, the forging die can have an extended life. On top of that, since the material can flow more uniformly during the forming process, the percentage of flawed first yokes 31 decreases.

Figure 7A:
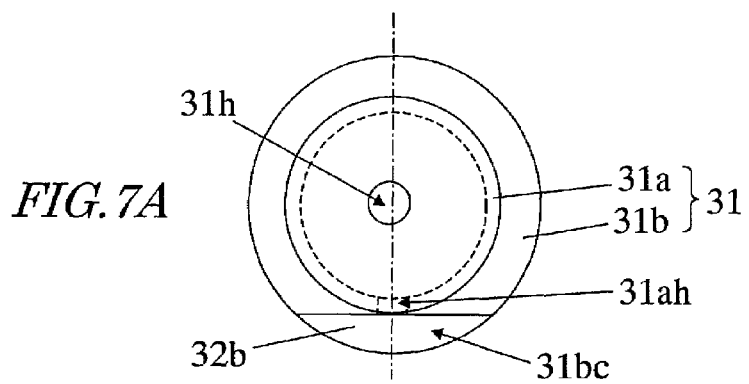
FIG. 7A is a top view schematically illustrating first and second yokes.
Figure 7B:
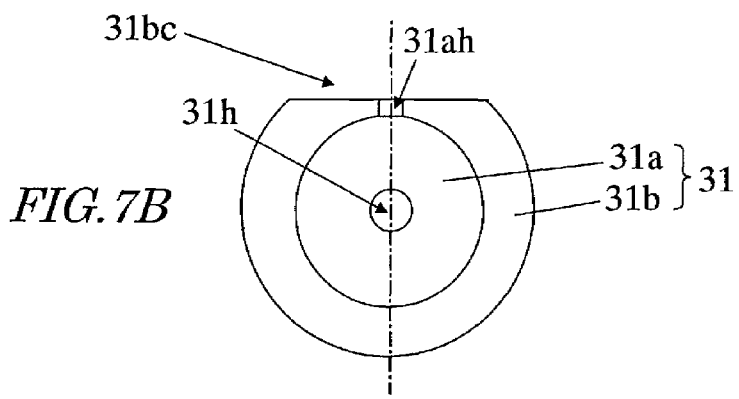
FIG. 7B is a bottom view schematically illustrating only the first yoke.
Figure 8A:
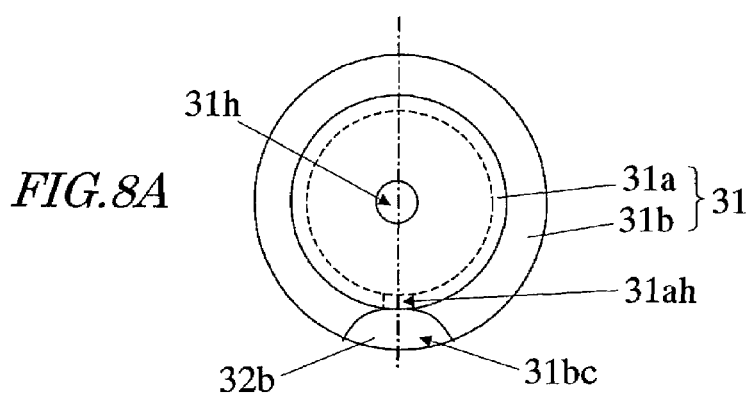
FIG. 8A is a top view schematically illustrating first and second yokes.
Figure 8B:
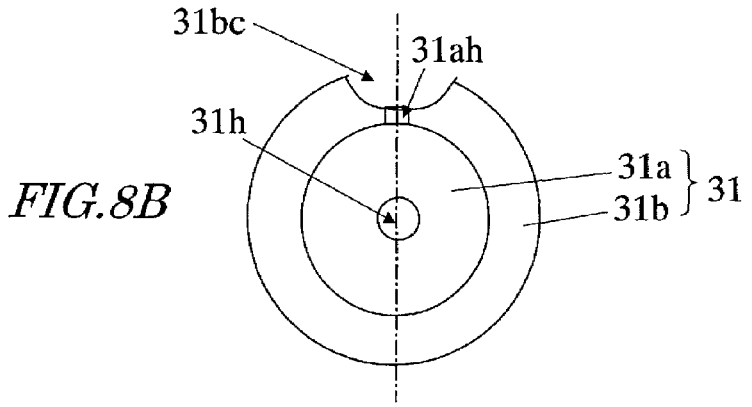
FIG. 8B is a bottom view schematically illustrating only the first yoke.

The effect described above is not achieved just by the symmetrical shape shown in FIGS. 5A and 5C. FIGS. 7A, 7B, 8A, 8B, 9A and 9B illustrate alternative shapes for the flange portion 31b of the first yoke 31. Specifically, the respective FIGS. 7A, 8A and 9A are top views illustrating the first and second yokes 31 and 32 and the respective FIGS. 7B, 8B and 9B are bottom views illustrating only the first yoke 31.

The flange portion 31b of the first yoke 31 shown in FIGS. 5A and 5C has a pair of notches 31bc. On the other hand, the flange portion 31b of the first yoke 31 shown in FIGS. 7A and 7B has only one notch 31b.

Also, in the flange portion 31b of the first yoke 31 shown in FIGS. 5A and 5B, the notches 31bc have an arched shape with a linear edge. Meanwhile, in the flange portion 31b of the first yoke 31 shown in FIGS. 8A and 8B, the notch 31bc has an arched edge and has its shape defined by two arcs (i.e., an arched biangular shape).

Furthermore, the flange portion 31b of the first yoke 31 shown in FIGS. 9A and 9B has not only the notch 31bc in the vicinity of the conductor passage hole 31ah but also two more notches 31bc. That is to say, the flange portion 31b has three notches 31bc in total, which are arranged so as to equally divide the annular flange portion 31b into three portions.

The flange portion 31b with the shape shown in FIG. 7A, 7B, 8A, 8B, 9A, or 9B can also achieve the effects of extending the life of the die and decreasing the percentage of flawed products.

Also, as viewed along the central axis of the through hole 10h, the flange portion 31b preferably has a rotational symmetry (more specifically, at least twofold rotational symmetry) as shown in FIGS. 5A-5C, 9A, and 9B. If the flange portion 31b has rotational symmetry, the stress can be balanced well during the forging process and it is possible to prevent stress from being concentrated on the forging die. As a result, the forging die can have an extended life and the manufacturing cost can be reduced. In addition, as the material can flow more smoothly during the forming process, the precision of the products will improve and the yield will increase.

Furthermore, as shown in FIGS. 5A-5C, 7A, 7B, 8A, 8B, 9A, and 9B, the width W1 of the notches 31bc (see FIG. 5B) is preferably greater than the width W2 of the conductor passage hole 31ah (see also FIG. 5B). The reason is that if the width W1 of the notches 31bc (which is the width of the linear portion as measured along a substantially tangential line drawn with respect to the conductor passage hole 31ah in the example illustrated in FIG. 5B) is greater than the width W2 of the conductor passage hole 31ah, the process steps of extending and connecting the lead wire 12 can be performed more easily and efficiently during the assembling process. Also, the flange portion 31b never interferes with the press process to make it easier to perform that process more efficiently.

In the preferred embodiments described above, the first and second yokes 31 and 32 are supposed to be joined together by press-fitting each other. However, this is not the only technique of joining the first and second yokes 31 and 32 together. For example, the first and second yokes 31 and 32 may also be joined together by bonding, threaded connections, or by any other suitable technique. Nevertheless, if the first and second yokes 31 and 32 are joined together by (light) press-fitting, bonding or threaded connections, too much stress will not be placed on the magnetic material and the deterioration of the properties can be reduced. Also, these techniques ensure that the work is performed more efficiently at a reduced cost.

Furthermore, the direction in which the housing 50 fixes the flange portions 31b and 32b and the direction in which the first and second yokes 31 and 32 are joined together by press-fitting, bonding or threaded fasteners are preferably almost the same direction (which are both the horizontal direction in FIG. 2). In that case, it is possible to prevent, with more certainty, the first and second yokes 31 and 32 joined together from shifting from each other even when the yokes are exposed to significant vibrations or impact.

Figure 10A:
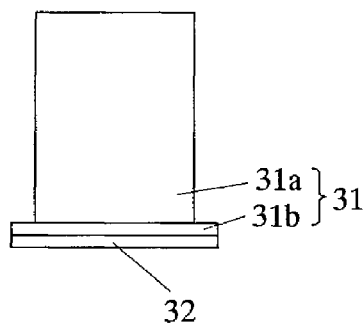
FIGS. 10A through 10D are side views schematically illustrating various combinations of first and second yokes.
Figure 10B:
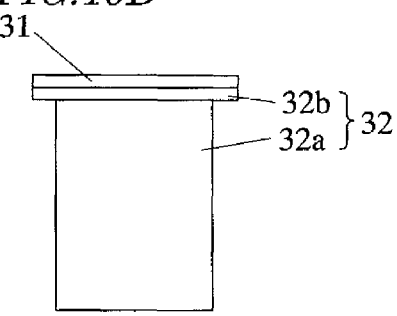

Next, the shapes of alternative yokes for use in the magnetostrictive load sensor 100a of this preferred embodiment will be described with reference to FIGS. 10A-10D. In the arrangement shown in FIG. 1 and other drawings, the first and second yokes 31 and 32 are joined together at one end of the sensor core portion (e.g., at the lower end supposing the first yoke 31 is located over the second yoke 32) as in the example illustrated in FIG. 10A. However, the junction does not have to be located in the sensor core portion. Alternatively, the first and second yokes 31 and 32 may also be joined together at the other end (i.e., the upper end) of the sensor core portion as shown in FIG. 10B. In that case, the first and second yokes 31 and 32 have interchanged their shapes with each other compared to the example illustrated in FIG. 10A. In this arrangement, a conductor passage hole may be bored through the body portion 32a of the second yoke 32.

Figure 10C:
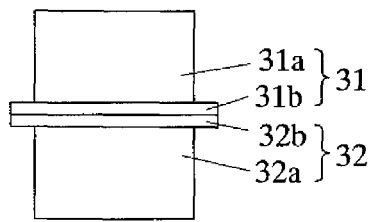
Figure 10D:
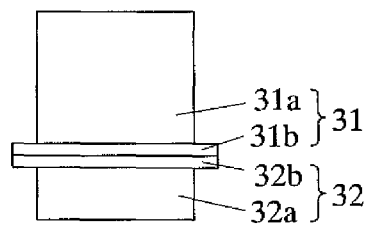

Alternatively, the first and second yokes 31 and 32 may also be joined together almost at the middle of the sensor core portion as shown in FIG. 10C. Still alternatively, the first and second yokes 31 and 32 may also be joined together between the middle and the end of the sensor core portion as shown in FIG. 10D. In these cases, a conductor passage hole may be bored through any of the first and second yokes 31 and 32. Also, the flange portion of one of the two yokes that has the conductor passage hole preferably has notches for the reasons described above. Furthermore, if the first and second yokes 31 and 32 are joined together at the middle of the sensor core portion as shown in FIG. 10C, then the first and second yokes 31 and 32 may have either the same shape or at least similar shapes. That is why the arrangement shown in FIG. 10C is cost-effective.

Figure 11:
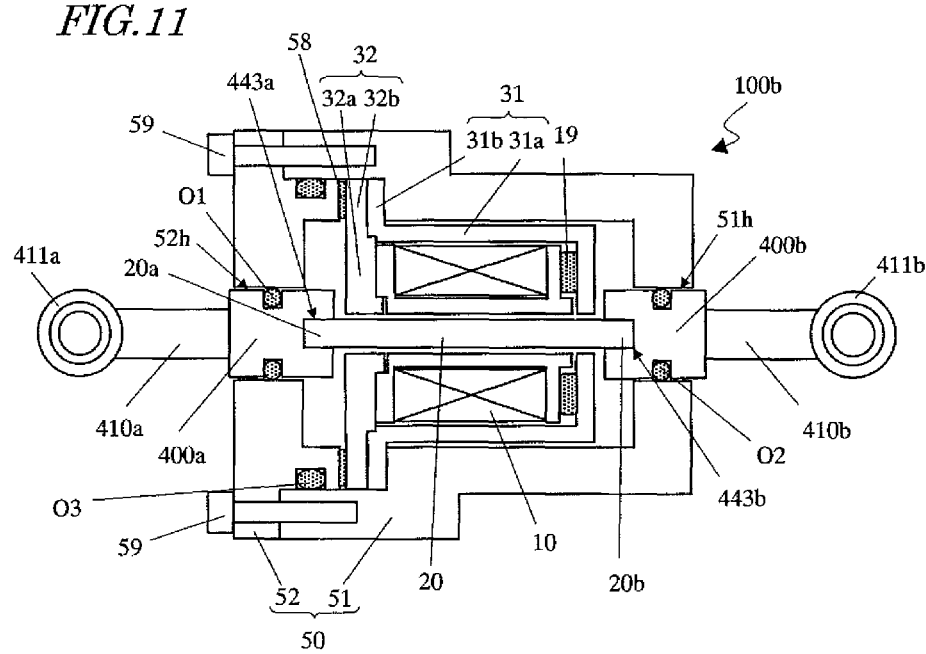
FIG. 11 is a cross-sectional view schematically illustrating another preferred embodiment of a magnetostrictive load sensor of the present invention.

Hereinafter, another example of the more specific structure of the magnetostrictive load sensor 100 will be described with reference to FIG. 11.

This magnetostrictive load sensor 100b includes load transfer members 400a and 400b instead of the counterparts 40a and 40b shown in FIG. 3. The load transfer members 400a and 400b have a different shape from those members 40a and 40b.

Specifically, the load transfer members 400a and 400b have a columnar shape. At one end of each of these load transfer members 400a and 400b, a circular recess 443a or 443b is bored at the center.

One end 20a of the rod member 20 is inserted into the recess 443a of the load transfer member 400a, thereby joining the load transfer member 400a and the rod member 20 together. The rod member 20 may be joined with the load transfer member 400a by, for example, threaded fasteners, press-fitting, bonding, welding or brazing.

Meanwhile, the other end 20b of the rod member 20 is inserted into the recess 443b of the load transfer member 400b, thereby joining the load transfer member 400b and the rod member 20 together. The rod member 20 may also be joined with the load transfer member 400b by, for example, threaded fasteners, press-fitting, bonding, welding or brazing.

The load transfer members 400a and 400b support the rod member 20 inside the housing 50. In that state, the load transfer members 400a and 400b are located inside the opening 52h of the housing cap 52 and inside the opening 51h of the housing body 51, respectively, and are supported under the elastic force of the O-rings O1 and O2.

Each of these load transfer members 400a and 400b includes a load transfer shaft 410a, 410b that is aligned with the central axis of the rod member 20 and that extends to reach outside of the magnetostrictive load sensor 100b. The load transfer shafts 410a and 410b define integral portions of the load transfer members 400a and 400b, respectively. Furthermore, ring members 411a and 411b are provided at the respective far ends of the load transfer shafts 410a and 410b so as to define integral portions of the load transfer shafts 410a and 410b, respectively.

The permeability of the rod member 20 varies not just when subjected to compressive stress but also when subjected to tensile stress. That is why the impedance of the sensor core portion changes with the compressive and tensile stresses that are placed on the rod member 20.

Since the rod member 20 and the load transfer members 400a and 400b are joined together, the magnetostrictive load sensor 100b with such a configuration can sense the compressive stress that is applied between the two ring members 411a and 411b along the axis of the rod member 20. In addition, the magnetostrictive load sensor 100b can also sense the tensile stress that is applied between the two ring members 411a and 411b along the axis of the rod member 20.

Second Preferred Embodiment

Hereinafter, the basic structure of a magnetostrictive load sensor 200 according to a second preferred embodiment of the present invention will be described with reference to FIG. 12.

Figure 12:
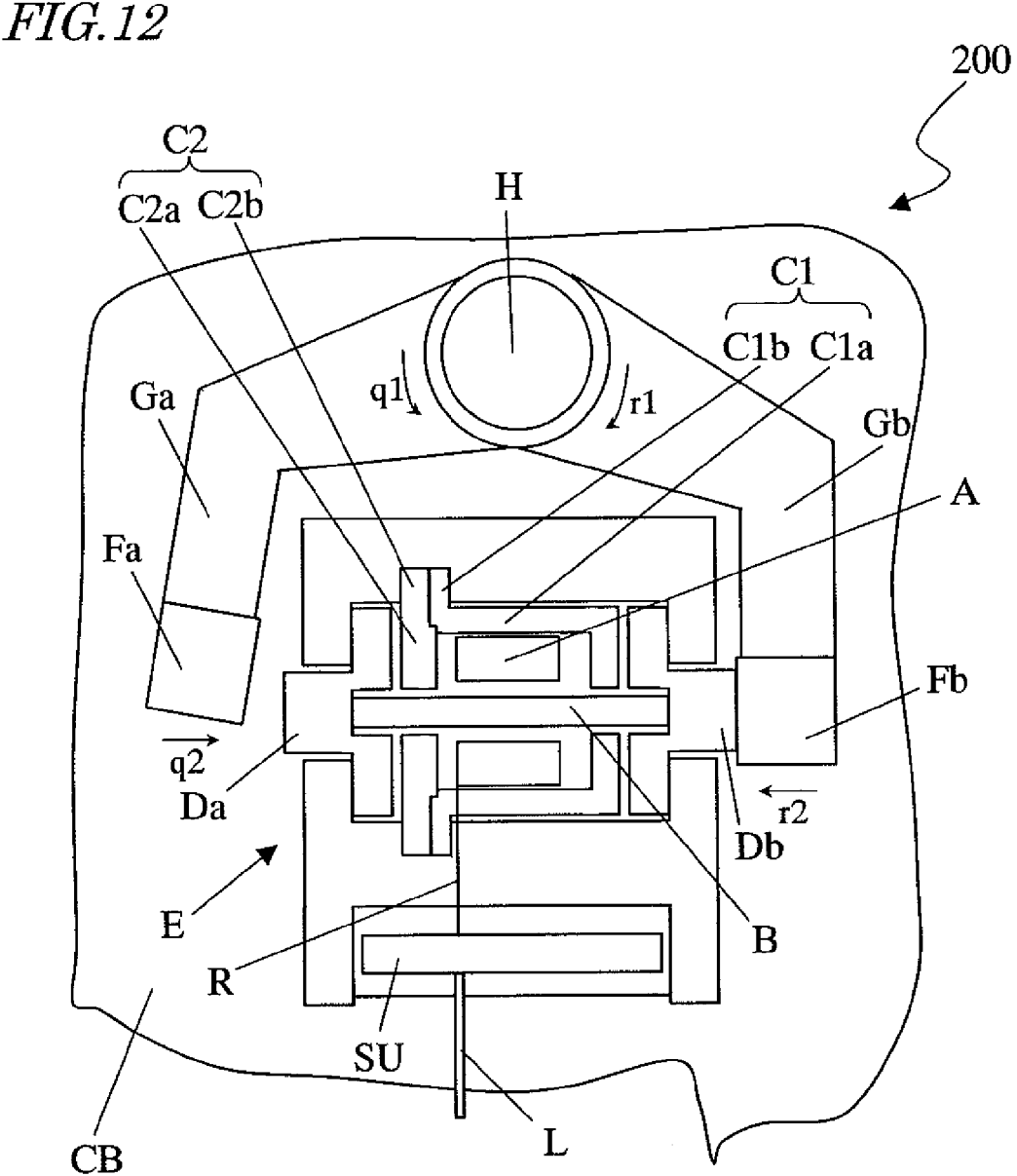
FIG. 12 is a schematic representation of another preferred embodiment of a magnetostrictive load sensor of the present invention.

As shown in FIG. 12, the magnetostrictive load sensor 200 is put on a base CB, and includes not just all members of the magnetostrictive load sensor 100 described above, but also two load application members Fa, Fb, two arms Ga, Gb and a shaft H.

On the base CB, arranged are the housing E and the shaft H with a predetermined gap left between them. The two arms Ga and Gb are connected together so as to form a substantially U-shaped arm, and are supported at the connected portion on the base CB so as to turn on the shaft H. The load application members Fa and Fb are attached to the respective ends of the two arms Ga and Gb.

As the arms Ga and Gb turn on the shaft H, the load application members Fa and Fb contact the load transfer members Da and Db, respectively, which are supported by the housing E.

As shown in FIG. 12, when the arms Ga and Gb turn in the direction indicated by the arrow q1, the load application member Fa attached to the arm Ga contacts the load transfer member Da. In this manner, load can be applied to the load transfer member Da in the direction indicated by the arrow q2.

On the other hand, when the arms Ga and Gb turn in the direction indicated by the arrow r1, the load application member Fb attached to the arm Gb contacts the load transfer member Db. In this manner, load can be applied to the load transfer member Db in the direction indicated by the arrow r2.

FIG. 12 also illustrates a substrate SU including various peripheral circuits such as, for example, an oscillator, a voltage detector (or current detector), a rectifier and an amplifier, which together define a load detector. A lead wire R extending from the coil A is connected to the substrate SU. Also, the substrate SU is further connected to an external device (not shown) by way of a cable L.

In this magnetostrictive load sensor 200, as the two load application members Fa and Fb rotate around the shaft H, a load is applied to the two load transfer members Da and Db that are supported at both ends of the housing E.

Consequently, the loads are applied to the load transfer members Da and Db substantially symmetrically. That is to say, the loads are applied from two opposite directions but their points of application are substantially symmetrical to each other. And the path of applying a load to one end of the rod member B and the path of applying a load to the other end thereof are symmetrical to each other. As a result, the loads that are applied from the two different directions can be sensed with the same accuracy.

In the magnetostrictive load sensor 200 of this preferred embodiment, both of the first and second yokes C1 and C2 have flange portions C1b and C2b, which are held and fixed together by the housing E. Consequently, the same effects as those achieved by the magnetostrictive load sensor 100 of the first preferred embodiment described above are also achieved by this preferred embodiment.

Next, a more specific structure for the magnetostrictive load sensor 200 of this preferred embodiment will be described.

Figure 13:
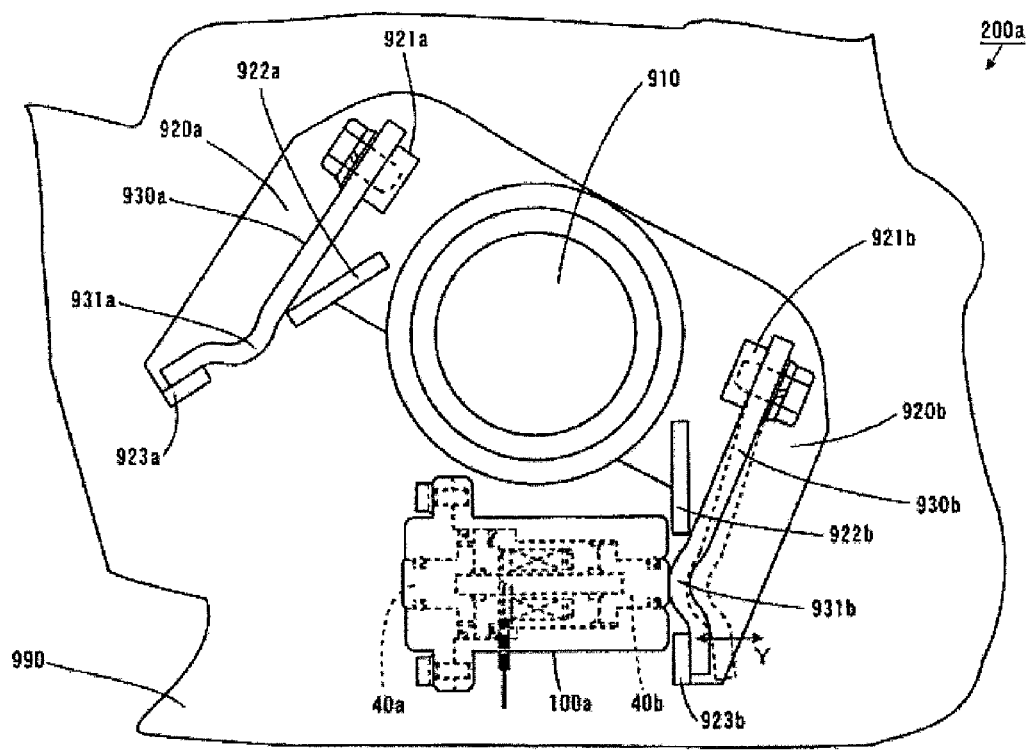
FIG. 13 is a top view schematically illustrating another preferred embodiment of a magnetostrictive load sensor of the present invention.

FIG. 13 illustrates an exemplary specific structure for the magnetostrictive load sensor 200 shown in FIG. 12. The magnetostrictive load sensor 200a shown in FIG. 13 includes not only the magnetostrictive load sensor 100a shown in FIG. 3 but also two arms 920a and 920b and a shaft 910, which respectively correspond to the arms Ga and Gb and the shaft H shown in FIG. 12.

As shown in FIG. 13, the magnetostrictive load sensor 200a is mounted on a base 990, on which are arranged at a predetermined interval the magnetostrictive load sensor 100a shown in FIG. 3 and the shaft 910. The two arms 920a and 920b are connected together so as to form a generally U-shaped arm and are supported at their connection on the base 990 so as to rotate on the shaft 910.

Leaf spring supporting members 921a and 921b are provided for the two arms 920a and 920b, respectively. Inside the arm 920a, arranged at a predetermined interval, are two load limiting members 922a and 923a. Likewise, two load limiting members 922b and 923b are also arranged at a predetermined interval inside the other arm 920b.

One end of a leaf spring 930a is secured to the leaf spring supporting member 921a with a bolt, for example. In the same way, one end of a leaf spring 930b is secured to the leaf spring supporting member 921b with a bolt, for example.

The other end of the leaf spring 930a is secured to the supporting member 921a and extends toward the end of the arm 920a; while the other end of the leaf spring 930b is secured to the supporting member 921b and extends toward the end of the arm 920b.

The leaf springs 930a and 930b have protrusions 931a and 931b, which are located closer to the other end than to the middle.

Specifically, the protrusion 931a of the leaf spring 930a is located approximately between the two load limiting members 922a and 923a and protrudes toward the inside of the arm 920a. In such a state, the leaf spring 930a is biased toward the inside of the arm 920a.

On the other hand, the protrusion 931b of the leaf spring 930b is located approximately between the two load limiting members 922b and 923b and protrudes toward the inside of the arm 920b. In such a state, the leaf spring 930b is biased toward the inside of the arm 920b.

In this example, the protrusions 931a and 931b of the leaf springs 930a and 930b are equivalent to the load application members Fa and Fb shown in FIG. 12. That is why as shown in FIG. 13, as the arms 920a and 920b rotate, the protrusions 931a and 931b contact with the load transfer members 40a and 40b of the magnetostrictive load sensor 100a one after another. In this manner, the load placed on the arms 920a and 920b is applied to the load transfer members 40a and 40b.

During that contact, the leaf springs 930a and 930b are deformed elastically as indicated by the arrow Y in FIG. 13.

In this case, if the load placed on the arm 920b, for example, is greater than the elastic force of the leaf spring 930b, then the leaf spring 930b will be pushed back toward the outside of the arm 920b while the protrusion 931b and the load transfer member 40b still keep contact with each other.

Then, the load limiting members 922b and 923b, arranged inside of the arm 920b, will contact with one end surface of the housing 50 as shown in FIG. 3. In this manner, the load placed on the arm 920b is applied to the points of contact between the load limiting members 922b and 923b and that one end surface of the housing 50.

As a result, it is possible to prevent a load that is greater than the elastic force of the leaf spring 930b from being applied to the load transfer member 40b. Consequently, it is possible to avoid an unwanted situation where the rod member 20, shown in FIG. 3, becomes damaged or deformed under an excessive load.

In this example, it has been described how the leaf spring 930b and the load limiting members 922b and 923b work for the arm 920b. Although not described, the leaf spring 930a and the load limiting members 922a and 923a provided for the arm 920a also work similarly. Consequently, the magnetostrictive load sensor 200a ensures increased durability and an extended life.

Third Preferred Embodiment

Hereinafter, a basic structure for a magnetostrictive load sensor 300 according to a third preferred embodiment of the present invention will be described with reference to FIG. 14.

Figure 14:
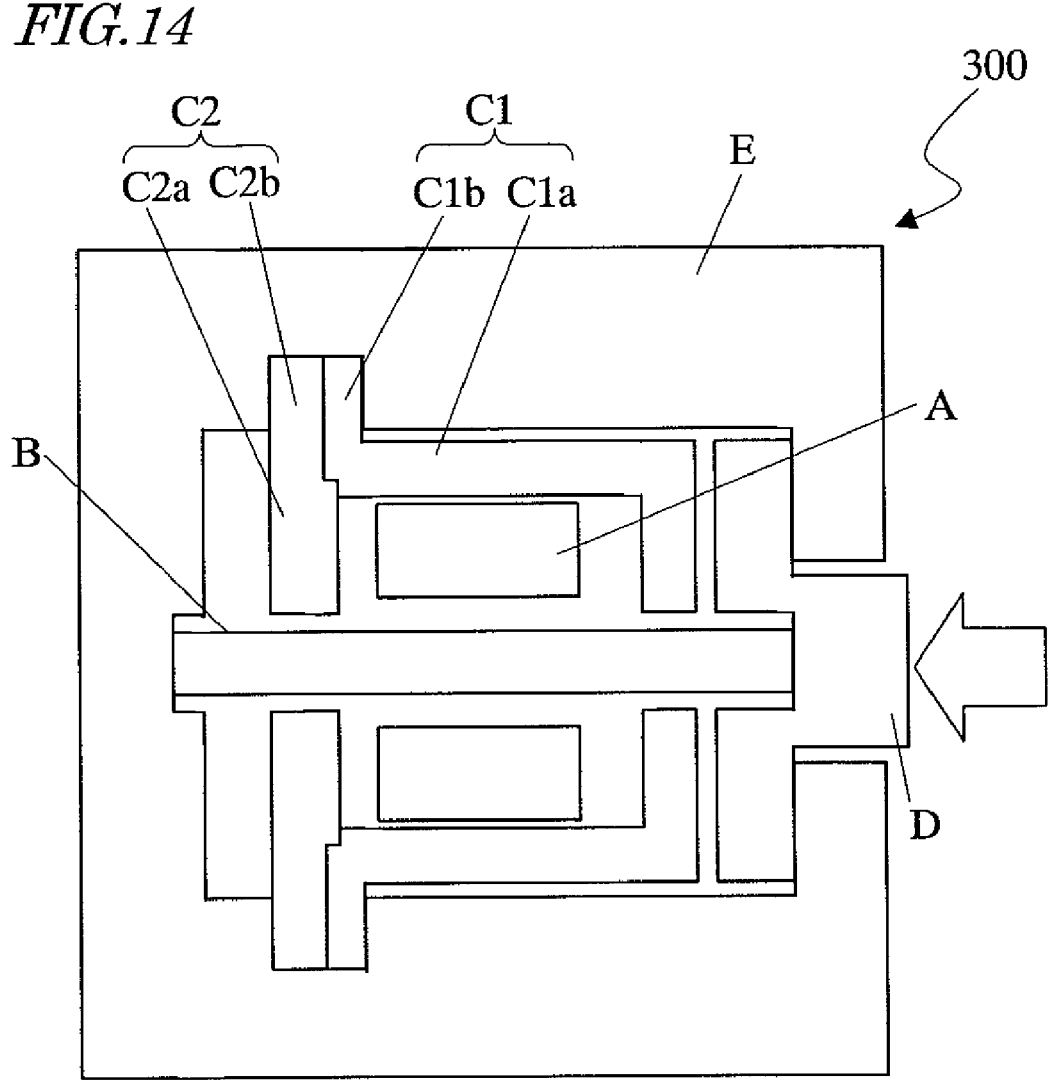
FIG. 14 is a schematic representation of another preferred embodiment of a magnetostrictive load sensor of the present invention.

As shown in FIG. 14, only one load transfer member D is provided for the magnetostrictive load sensor 300. The rod member B has one end thereof supported by one end surface of the housing E and the other end thereof supported by the load transfer member D.

With this configuration, the magnetostrictive load sensor 300 can sense only the load applied to one end of the rod member B. Thus, there is no need to provide the members for applying a load to the other end of the rod member B. As a result, the rod member B can have a decreased axial size and the sensor can have a simplified configuration, thus effectively reducing the cost. Also, in a situation where the load is applied from a single direction and only needs to be detected on one side, the space for installing such a sensor does not have to be great.

In the magnetostrictive load sensor 300 of this preferred embodiment, both of the first and second yokes C1 and C2 have flange portions C1b and C2b, which are held and fixed together by the housing E. Consequently, the same effects as those achieved by the magnetostrictive load sensor 100 of the first preferred embodiment described above are also achieved by this preferred embodiment.

Next, a more specific structure for the magnetostrictive load sensor 300 of this preferred embodiment will be described.

Figure 15:
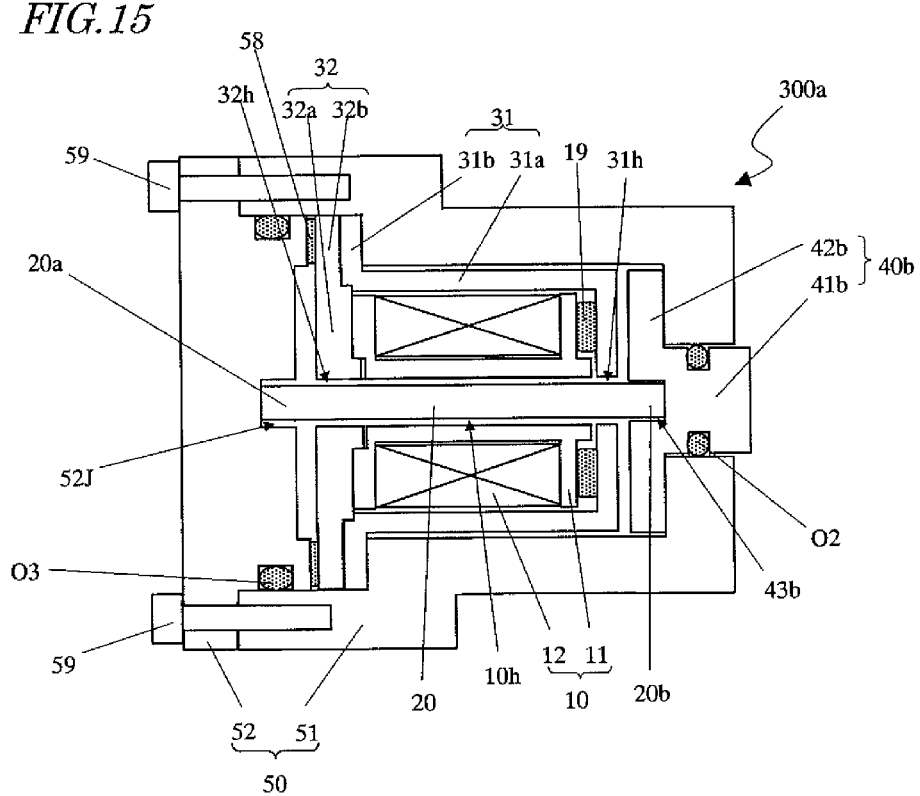
FIG. 15 is a cross-sectional view schematically illustrating another preferred embodiment of a magnetostrictive load sensor of the present invention.

FIG. 15 illustrates an exemplary specific structure for the magnetostrictive load sensor 300. The magnetostrictive load sensor 300a shown in FIG. 15 does not have the load transfer member 40a shown in FIG. 3. Also, at the center of the housing cap 52 of the housing 50, not the opening 52h but a circular or substantially circular recess 52J is bored on one surface thereof. The rod member 20 has one end 20a thereof supported by the recess 52J of the housing cap 52 and the other end 20b thereof supported by the load transfer member 40b.

Thus, the magnetostrictive load sensor 300a can sense the given load only when the load is applied to the load transfer member 40b that extends out of the housing 50.

Load Detector Including Magnetostrictive Load Sensor

Next, a configuration for a load detector including the magnetostrictive load sensor will be described with reference to FIG. 16, which is a block diagram showing a general configuration for a load detector 600 including the magnetostrictive load sensor 100. Specifically, as the magnetostrictive load sensor 100, one of the magnetostrictive load sensors 100a and 100b may be used.

The load detector 600 includes an oscillator 610, the magnetostrictive load sensor 100, a temperature compensating resistor 620, current detectors 630A, 630B, rectifiers 650A, 650B and an amplifier 670.

The oscillator 610 applies an oscillation signal to one terminal of the coil of the magnetostrictive load sensor 100 and to one terminal of the temperature compensating resistor 620. The magnetostrictive load sensor 100 senses a load that has been applied externally. The current detector 630A converts the current supplied through the other terminal of the coil of the magnetostrictive load sensor 100 into a voltage. The current detector 630B converts the current supplied through the other terminal of the temperature compensating resistor 620 into a voltage. The rectifiers 650A and 650B rectify and smooth the voltages that have been supplied from the current detectors 630A and 630B, respectively. And the amplifier 670 amplifies the difference between the output voltages of the rectifiers 650A and 650B.

As described above, the load applied to the load transfer member Da shown in FIG. 1 is transferred to one end of the rod member B. In this manner, compressive stress is exerted on the rod member B. Then, a reverse magnetostrictive effect is produced to cause a variation in the permeability of the rod member B and change the impedances of the sensor core portion including the coil A, the rod member B, and the first and second yokes C1 and C2. An output signal representing this impedance variation is obtained by the amplifier 670. In this manner, the load can be sensed electromagnetically.

The output signal of the amplifier 670 of this load detector 600 is passed to a control section 680, which includes a CPU (central processing unit) and a RAM (random access memory). The CPU operates following a control program that is stored in the RAM. The control section 680 performs predetermined computations on the output signal of the amplifier 670 and outputs a control signal, representing results of the computations, to an actuator 690. In response to the control signal, the actuator 690 generates a driving force.

Optionally, the magnetostrictive load sensor 100 could be replaced with the magnetostrictive load sensor 200 (200a) or 300 (300a).

Hydroplane Including Magnetostrictive Load Sensor

Figure 17:
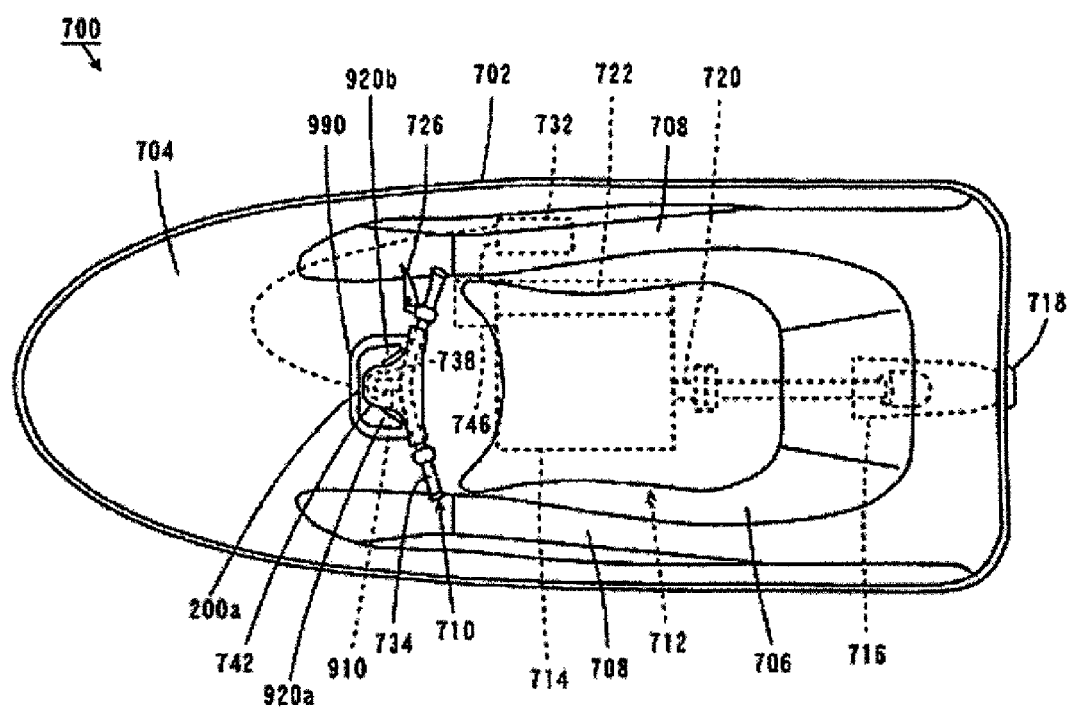
FIG. 17 is a plan view schematically illustrating a hydroplane including a magnetostrictive load sensor.
Figure 18:
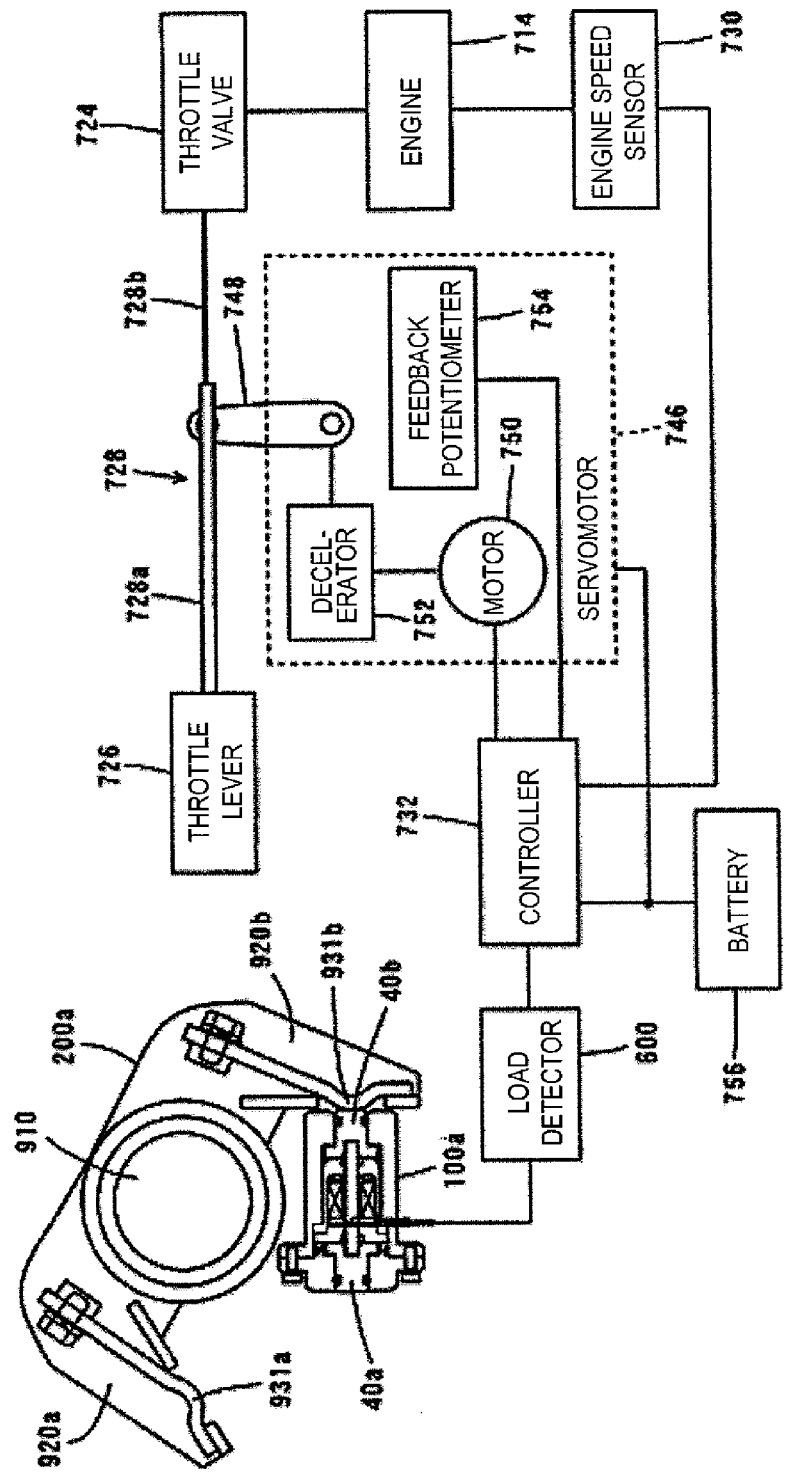
FIG. 18 is a block diagram showing a control system for the hydroplane.

Hereinafter, a structure for a hydroplane including the magnetostrictive load sensor will be described with reference to FIGS. 17 and 18. FIG. 17 is a plan view illustrating a hydroplane 700 including the magnetostrictive load sensor 200a shown in FIG. 13. FIG. 18 is a block diagram showing a control system for the hydroplane 700 shown in FIG. 17.

As shown in FIG. 17, the hydroplane 700 includes a hull 702. On the upper deck 704 of the hull 702, arranged is a seat 706 on which the handler rides and seats himself or herself. On the right- and left-hand sides of the seat 706, there are steps 708 to allow the handler to put his or her feet on. In front of the seat 706, a steering wheel 710 is arranged for the handler to grip with his or her hands. A water jet propeller 712 is provided inside the hull 702.

The water jet propeller 712 includes an engine 714 and a jet pump 716, at the rear end of which is arranged a nozzle deflector 718. This water jet propeller 712 pumps up water from the bottom of the hull 702 using the power of the engine 714 and ejects the water through the nozzle deflector 718 at the rear end of the jet pump 716, thereby generating thrust.

The nozzle deflector 718 is supported at the rear end of the jet pump 716 so as to swing to the right and left, and is connected to the lower end of the steering wheel 710 with a push-pull wire and a steering arm (not shown).

The engine 714 is a multiple cylinder engine and is arranged such that the crankshaft 720 thereof moves back and forth along the hull 702. An induction system 722 is connected to the right-hand side of the hull 702, while an exhaust system (not shown) is connected to the left-hand side of the hull 702. The induction system 722 includes a plurality of carburetors for the respective cylinders of the engine 714 such that fuel is supplied from each of those carburetors to its associated cylinder. Each carburetor includes the throttle valve 724 shown in FIG. 18. The throttle valves 724 are biased in a closing direction by return springs (not shown).

The steering wheel 710 includes handlebars 734 to be gripped by the handler, a steering bearing 738, a steering shaft 910 and a base (attachment plate) 990. The steering shaft 910 is secured to the center of the handlebars 734. The steering bearing 738 supports the steering shaft 910 rotatably. And the base 990 fixes the steering bearing 738 on the deck 704.

The magnetostrictive load sensor 200a shown in FIG. 13 is attached on the base 990. The arms 920a and 920b of the magnetostrictive load sensor 200a are secured to the shaft 910. Also, a handle cover 742 is provided so as to cover the handlebars 734 and the steering shaft 910.

To the lower end of the steering shaft 910, a steering push-pull wire is connected by way of a steering arm (not shown). As the handlebars 734 are turned to the right or left, the steering arm also rotates in the same direction, and the nozzle deflector 718 swings to the right or left through the push-pull wire.

A throttle lever 726 is provided on the handlebars 734. The throttle valves 724 (see FIG. 18) are joined together so as to operate in conjunction with each other. And one of those throttle valves 724 that is located closest to the front end of the hull 702 is connected to the throttle lever 726 of the steering wheel 710 with the throttle wire 728 (see FIG. 18). By operating the throttle lever 726, all of those throttle valves 724 can be opened and closed synchronously with each other.

As shown in FIG. 18, an engine speed sensor 730 for detecting the rotational frequency of the crankshaft 720 shown in FIG. 17 is provided for the engine 714 and outputs a rotational frequency signal, representing the engine speed, to a controller 732.

Not only a throttle controlling servomotor 746 but also the load detector 600 including the magnetostrictive load sensor 100a are connected to the controller 732, which is driven by a battery 756.

The servomotor 746 is made up of an arm 748, a motor 750, a decelerator 752 and a feedback potentiometer 754. The rotational frequency of the motor 750 is decreased by the decelerator 752 and then is transmitted to the arm 748. The actual swing angle of the arm 748 is detected by the feedback potentiometer 754. The controller 732 controls the motor 750 such that the detected swing angle of the arm 748 matches the target angle of the arm 748. In this manner, the servomotor 746 performs a feedback control on the angle of the arm 748.

As described above, the throttle valves 724 are connected to the throttle lever 726 through the throttle wire 728, which is inserted into, and runs through, the steering shaft 910 shown in FIG. 17. The throttle wire 728 includes an outer tube 728a and an inner wire 728b. The outer tube 728a is connected to the arm 748 of the servomotor 746, while the inner wire 728b is connected to the throttle valves 724. By swinging the arm 748 of the servomotor 746, the throttle valves 724 can be opened and closed by way of the inner wire 728b.

The controller 732 and the throttle controlling servomotor 746 together define a steering aid unit, which can be used to improve the steering performance when the boat is running at low speeds.

The controller 732 receives an output signal of the load detector 600 representing the magnitude of the given load. If the magnitude of the load represented by the output signal is greater than a predetermined value, the controller 732 outputs a control signal to the servomotor 746 to swing the arm 748. The predetermined value is defined to be equal to the load that will be detected by the magnetostrictive load sensor 200a when the handler turns the steering wheel 710 shown in FIG. 17 to the limit (i.e., when the steering angle is the maximum) and when a greater force than a normal steering force is applied to the handlebars 734.

By using such a steering aid unit, the handler can turn the steering wheel 710 to the limit while the hydroplane 700 is running at low speeds. When the handler applies a greater steering force than a normal one, the controller 732 performs a steering control.

In that case, the controller 732 sets the target angle of the arm 748 of the servomotor 746 based on the load detected by the magnetostrictive load sensor 100a. Then, the controller 732 performs a feedback control on the servomotor 746 such that the angle of the arm 748 as detected by the feedback potentiometer 754 agrees with that target angle.

As a result, the throttle valves 724 are opened to such a degree as determined by the load detected by the magnetostrictive load sensor 100a (which corresponds to the force applied by the handler to the steering wheel 710), and the output of the engine 714 is controlled.

Figure 16:
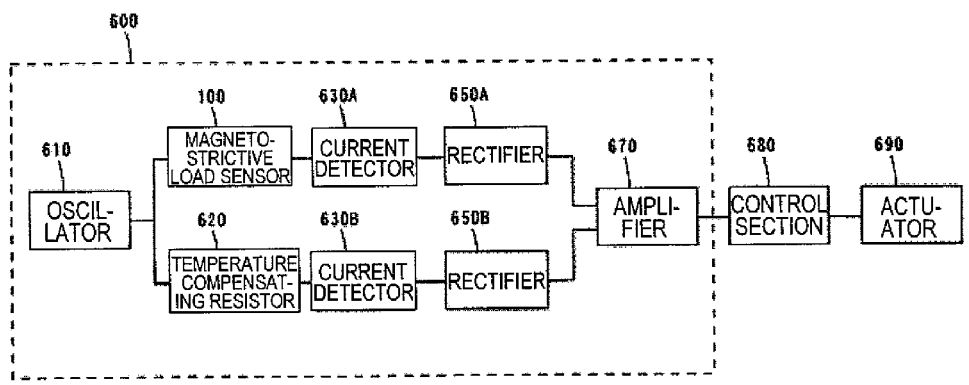
FIG. 16 is a block diagram showing a general configuration for a load detector including a magnetostrictive load sensor.

In this example, the controller 732 corresponds to the control section 680 shown in FIG. 16 and the servomotor 746 corresponds to the actuator 690.

Electric Bicycle Including the Magnetostrictive Load Sensor

Figure 19:
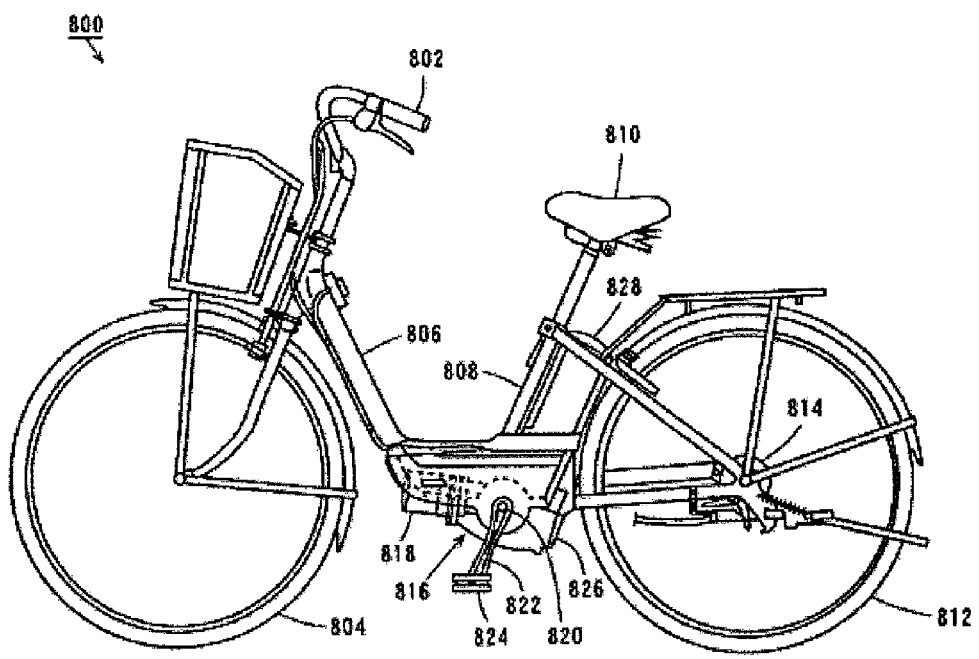
FIG. 19 is a side view schematically illustrating an electric bicycle including a magnetostrictive load sensor.
Figure 20:
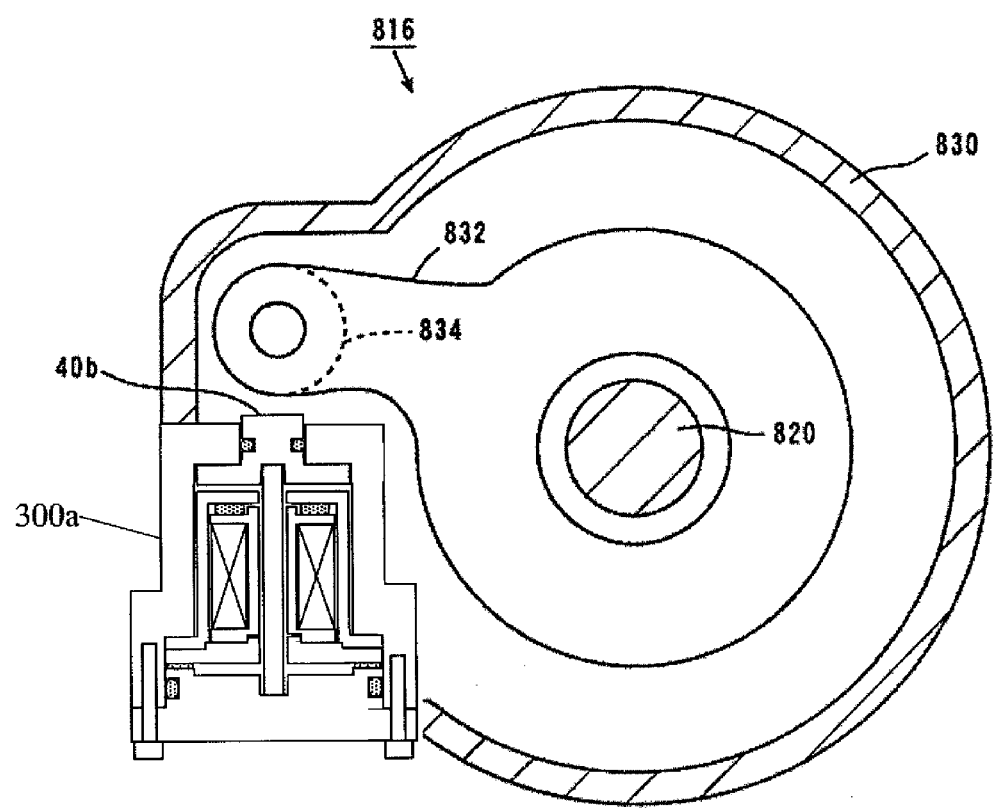
FIG. 20 is a cross-sectional view illustrating a configuration for a power unit for use in the electric bicycle.
Figure 23:
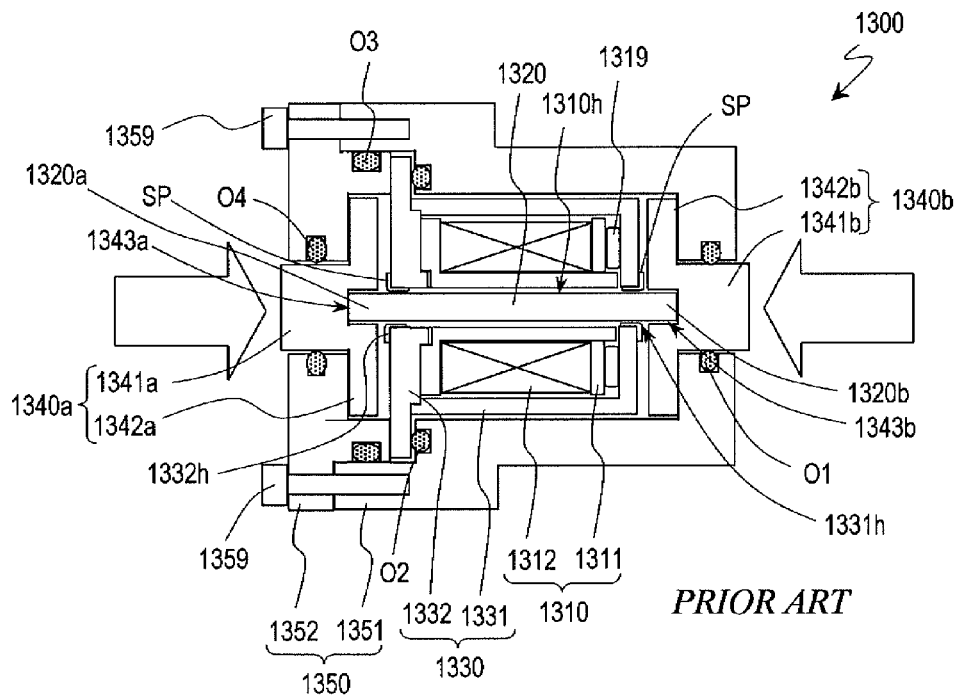
FIG. 23 is a cross-sectional view schematically illustrating a conventional magnetostrictive load sensor.

Hereinafter, a structure for an electric bicycle including the magnetostrictive load sensor will be described with reference to FIGS. 19 and 20. FIG. 19 is a side view illustrating an electric bicycle 800 including the magnetostrictive load sensor 300a shown in FIG. 15. FIG. 20 is a cross-sectional view illustrating a configuration for a power unit 816 for use in the electric bicycle shown in FIG. 19.

The electric bicycle 800 shown in FIG. 19 includes handlebars 802, a front wheel 804, a down tube 806, a seat tube 808, a seat (or saddle) 810, a rear wheel 812 and a wheel sprocket 814. The power unit 816 is arranged at approximately the center of the lower portion of this electric bicycle 800.

The power unit 816 includes a manual drive system and an auxiliary power system driven by an electric motor 818, and outputs the resultant force of the rider's input and the auxiliary electric power. A crankshaft 820 is connected rotatably to the power unit 816 and a pair of cranks 822 is secured to the right- and left-hand sides of the crankshaft 820. A pedal 824 is further attached rotatably to the end of each of those cranks 822. A controller 826 is connected to the power unit 816, which controls the output (i.e., the auxiliary output) of the electric motor 818 according to the magnitude of the torque that is manually input to the crankshaft 820 by the rider.

Furthermore, a removable battery box 828 is attached to the space under the seat 810 and between the seat tube 808 and the rear wheel 812. A Ni—Cd battery (not shown), including multiple unit cells that are shrink-packed, is stored in the battery box 828.

When the rider rotates and drives the crankshaft 820 by pumping the pedals 824, the torque input to the crankshaft 820 is detected by the magnetostrictive load sensor 300a shown in FIG. 20. In response, the controller 826 controls the output (i.e., the auxiliary power) of the electric motor 818 according to the torque detected.

Consequently, the resultant force of the manual input force and auxiliary electric power that is proportional to the manual force is transmitted from the power unit 816 to the wheel sprocket 814 by way of a chain (not shown), thereby rotating and driving the wheel sprocket 814 and the rear wheel 812. As a result, the electric bicycle 800 is propelled with both the manual force and the auxiliary electric power proportional to the manual force.

As shown in FIG. 20, the power unit 816 includes a housing 830, in which an arm 832, connected to the crankshaft 820, and the magnetostrictive load sensor 300a are housed. Also, the arm 832 is connected to a roller 834 by way of a ring gear (not shown) such as a planetary gear train. And the roller 834 contacts with the load transfer member 40b of the magnetostrictive load sensor 300a.

In this electric bicycle 800, a reactive force is generated in the ring gear of the planetary gear train proportionally to the torque transmitted from the crankshaft 820 and is applied to the load transfer member 40b of the magnetostrictive load sensor 300a by way of the roller 834. The current output from the magnetostrictive load sensor 300a is supplied to the load detector 600 shown in FIG. 16. The controller 826 calculates the magnitude of the torque based on the output signal of the load detector 600 shown in FIG. 16 and controls the output (i.e., the auxiliary electric power) of the electric motor 818 based on the torque.

In this manner, by using the magnetostrictive load sensor 300a, the torque input to the crankshaft 820 can be detected accurately.

In this example, the controller 826 corresponds to the control section 680 shown in FIG. 16 and the electric motor 818 corresponds to the actuator 690.

It should be noted that any of the magnetostrictive load sensors 100a, 100b, 200a and 300a described above are applicable to not only hydroplanes and electric bicycles, but also various types of vehicles including motorcycles, personal watercrafts, motorized wheelchairs and numerous other sorts of motorized devices, such as a motorized shelf etc.

The preferred embodiments of the present invention can be used effectively to detect a given load in various types of vehicles such as hydroplanes, electric bicycles, motorcycles, personal watercrafts, motorized wheelchairs and in numerous other sorts of motorized devices such as motorized shelves.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A magnetostrictive load sensor comprising:
   a coil with a through hole;
   a load sensing member disposed in the through hole;
   first and second magnetic circuit defining members, which are joined together so as to surround the coil and which together define a magnetic circuit to transmit a magnetic flux generated by a current flowing through the coil; and
   a housing arranged to house the coil, the load sensing member, and the first and second magnetic circuit defining members; wherein
   each of the first and second magnetic circuit defining members include a first portion that contributes to defining the magnetic circuit and a second portion that is arranged so as to extend from the first portion and out of the magnetic circuit; and
   the housing holds together the second portions of the first and second magnetic circuit defining members.

2. The magnetostrictive load sensor of claim 1, wherein
   the coil includes a bobbin and a conductor wound around the bobbin; and
   the first portion of one of the first and second magnetic circuit defining members has a conductor passage hole allowing a conductor extending from the coil to pass there through.

3. The magnetostrictive load sensor of claim 2, wherein the second portion of the one magnetic circuit defining member is arranged so as to overlap with the conductor passage hole when viewed along the central axis of the through hole.

4. The magnetostrictive load sensor of claim 2, wherein when viewed along the central axis of the through hole, an outer periphery of the second portion of the one magnetic circuit defining member is partially in contact with an outer periphery of the first portion of the one magnetic circuit member.

5. The magnetostrictive load sensor of claim 4, wherein the outer periphery of the second portion has a substantially linear portion that runs along a substantially tangential line with respect to the conductor passage hole.

6. The magnetostrictive load sensor of claim 5, wherein the substantially linear portion on the outer periphery of the second portion has a greater width than the conductor passage hole.

7. The magnetostrictive load sensor of claim 2, wherein the second portion of the one magnetic circuit member has a notch cut out in the vicinity of the conductor passage hole; and the notch has a greater width than the conductor passage hole.

8. The magnetostrictive load sensor of claim 2, wherein the conductor passage hole is arranged as a slit running continuously from one end of the first portion.

9. The magnetostrictive load sensor of claim 2, wherein, when viewed along the central axis of the through hole, the second portion is substantially axially symmetrical with respect to a line that passes through the respective centers of the through hole and the conductor passage hole.

10. The magnetostrictive load sensor of claim 2, wherein when viewed along the central axis of the through hole, the second portion is substantially rotationally symmetrical.

11. The magnetostrictive load sensor of claim 1, further comprising an elastic member that is arranged between the second portion of one of the first and second magnetic circuit defining members and the housing.

12. The magnetostrictive load sensor of claim 1, wherein the first and second magnetic circuit defining members are joined together by press-fitting, bonding, or threaded fasteners.

13. The magnetostrictive load sensor of claim 12, wherein a direction in which the second portion is held by the housing is substantially the same as a direction in which the first and second magnetic circuit defining members are joined together by press-fitting, bonding, or threaded fasteners.

14. A motorized device comprising the magnetostrictive load sensor of claim 1.

* * * * *